United States Patent
Shimizu

(10) Patent No.: US 12,223,587 B2
(45) Date of Patent: Feb. 11, 2025

(54) INFORMATION PROCESSING DEVICE, INFORMATION PROCESSING METHOD, AND INFORMATION DISTRIBUTION SYSTEM

(71) Applicant: SONY GROUP CORPORATION, Tokyo (JP)

(72) Inventor: Takayoshi Shimizu, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/245,861

(22) PCT Filed: Sep. 29, 2021

(86) PCT No.: PCT/JP2021/035882
§ 371 (c)(1),
(2) Date: Mar. 17, 2023

(87) PCT Pub. No.: WO2022/075152
PCT Pub. Date: Apr. 14, 2022

(65) Prior Publication Data
US 2023/0360316 A1    Nov. 9, 2023

(30) Foreign Application Priority Data

Oct. 8, 2020   (JP) .................................. 2020-170686

(51) Int. Cl.
*G06T 15/20* (2011.01)
*G06F 3/01* (2006.01)

(52) U.S. Cl.
CPC .............. *G06T 15/20* (2013.01); *G06F 3/012* (2013.01); *G06F 3/013* (2013.01)

(58) Field of Classification Search
CPC .......... G06T 15/20; G06F 3/012; G06F 3/013
See application file for complete search history.

(56) References Cited

U.S. PATENT DOCUMENTS

| 11,538,045 | B2* | 12/2022 | Newell | ................... G06V 40/20 |
| 11,575,856 | B2* | 2/2023 | Oz | ............................ G06F 3/012 |
| 11,609,625 | B2* | 3/2023 | Johnson | ................ G06F 3/0346 |

(Continued)

FOREIGN PATENT DOCUMENTS

| JP | 2018-075259 A | 5/2018 |
| JP | 2018-124826 A | 8/2018 |

(Continued)

OTHER PUBLICATIONS

International Search Report and Written Opinion of PCT Application No. PCT/JP2021/035882, issued on Nov. 30, 2021, 09 pages of ISRWO.

*Primary Examiner* — Benyam Ketema
(74) *Attorney, Agent, or Firm* — CHIP LAW GROUP

(57) ABSTRACT

To provide an information processing device, an information processing method, and an information distribution system capable of providing content with high added value. An information processing device according to the present disclosure includes a correction section that corrects a position of a virtual camera on the basis of first information regarding a height of a visual line of a performer in a virtual space and second information regarding a height of the virtual camera linked with a viewer in the virtual space.

16 Claims, 18 Drawing Sheets

(56) References Cited

U.S. PATENT DOCUMENTS

| | | | |
|---|---|---|---|
| 11,765,332 B2* | 9/2023 | Oz | G06T 19/006 |
| | | | 348/14.08 |
| 11,979,684 B2* | 5/2024 | Kawakami | G06F 3/04815 |
| 2017/0053450 A1* | 2/2017 | Rodriguez | G06T 7/579 |
| 2018/0120929 A1* | 5/2018 | Inomata | G06T 15/20 |
| 2018/0178124 A1* | 6/2018 | Noda | G06F 3/0346 |
| 2018/0196506 A1* | 7/2018 | Nakashima | G06F 3/017 |
| 2018/0247453 A1* | 8/2018 | Nakashima | G09G 5/00 |
| 2019/0088018 A1* | 3/2019 | Shenton | A63F 13/428 |
| 2019/0188895 A1* | 6/2019 | Miller, IV | G06F 17/18 |
| 2019/0220087 A1* | 7/2019 | Ishii | A63B 69/18 |
| 2020/0058152 A1* | 2/2020 | Zhang | G06F 1/163 |

FOREIGN PATENT DOCUMENTS

| | | | | |
|---|---|---|---|---|
| JP | 6556301 B1 | 8/2019 | | |
| WO | WO-2020044874 A1 * | 3/2005 | ......... | H04L 12/1813 |
| WO | 2019/118222 A1 | 6/2019 | | |

* cited by examiner

PERFORMER AVATAR   VIEWER AVATAR

FIG. 9
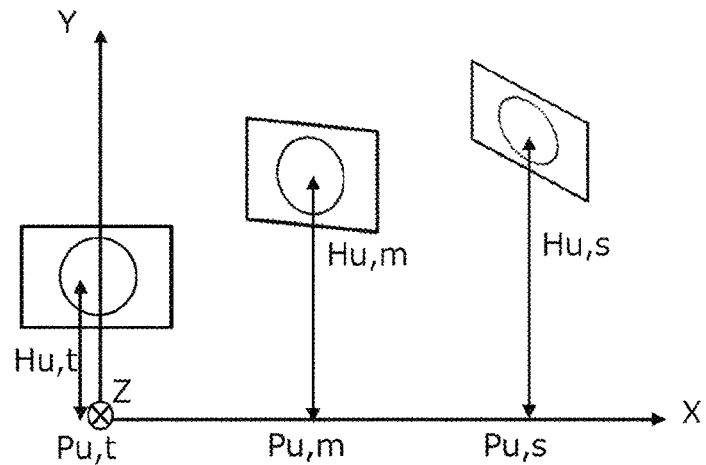
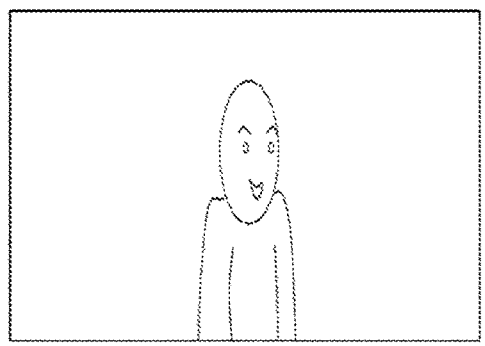
FIG. 10A
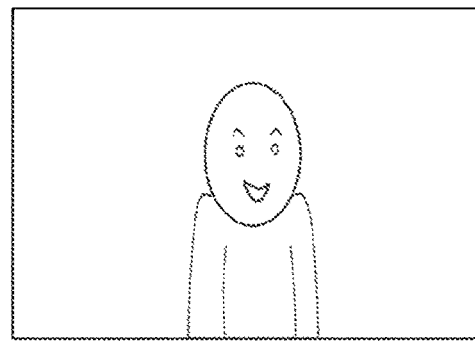
FIG. 10B
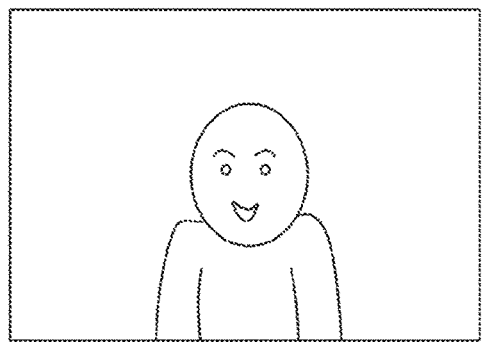
FIG. 10C
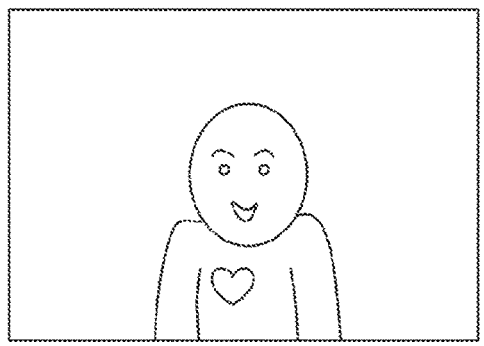
FIG. 10D

INFORMATION PROCESSING DEVICE, INFORMATION PROCESSING METHOD, AND INFORMATION DISTRIBUTION SYSTEM

CROSS REFERENCE TO RELATED APPLICATIONS

This application is a U.S. National Phase of International Patent Application No. PCT/JP2021/035882 filed on Sep. 29, 2021, which claims priority benefit of Japanese Patent Application No. JP 2020-170686 filed in the Japan Patent Office on Oct. 8, 2020. Each of the above-referenced applications is hereby incorporated herein by reference in its entirety.

TECHNICAL FIELD

The present disclosure relates to an information processing device, an information processing method, and an information distribution system.

BACKGROUND ART

A "gaze-meeting experience" with a performer such as a celebrity or a musician is extremely rare. An experience of being looked at and noticed by a performer gives a special feeling, and thus, is extremely valuable. In a case where one wears a VR (virtual reality) head mounted device, for example, and views content in a virtual space, an added value of the content can be enhanced if a simulated "gaze-meeting" experience is given. Under the present circumstances, a practical level has not been reached due to many accuracy-related problems because high-accuracy technologies including a machine learning technology and a facial organ recognition technology such as view morphing are required.

In a case where content is recorded in advance, the visual line direction of a performer is usually directed to a multi-viewpoint camera that is set in a photographing studio. In a case where a performer who is a woman and a viewer who is a tall man come close to each other in a virtual space, there is a difference in body heights between them. Accordingly, the probability that their eyes meet is very low. n order to be looked at, the man needs to change his posture by, for example, stooping down.

CITATION LIST

Patent Literature

[PTL 1]
Japanese Patent No. 6556301

SUMMARY

Technical Problem

The present disclosure provides an information processing device, an information processing method, and an information distribution system capable of providing content with high added value.

Solution to Problem

An information processing device according to the present disclosure includes a correction section that corrects a position of a virtual camera on the basis of first information regarding a height of a visual line of a performer in a virtual space and second information regarding a height of the virtual camera linked with a viewer in the virtual space.

An information processing method according to the present disclosure includes correcting a position of a virtual camera on the basis of first information regarding a height of a visual line of a performer in a virtual space and second information regarding a height of the virtual camera linked with a viewer in the virtual space.

An information distribution system according to the present disclosure include a distribution server that distributes content information including a performer, a control section that places the performer in a virtual space on the basis of the content information, and places a virtual camera linked with a viewer in the virtual space, and a correction section that corrects a position of the virtual camera on the basis of first information regarding a height of a visual line of the performer and second information regarding a height of the virtual camera.

BRIEF DESCRIPTION OF DRAWINGS

FIG. 9 is a diagram for explaining a process of correcting the position of a virtual camera of a viewer in a virtual space.

FIGS. 10A, 10B, 10C, and 10D depict diagrams depicting examples of an image (three-dimensional image) of a virtual space that is presented to a viewer who is wearing an HMD.

DESCRIPTION OF EMBODIMENTS

Hereinafter, embodiments of the present disclosure will be explained with reference to the drawings. Features included in one or more embodiments described in the present disclosure can be combined, and further, the resultant of the combination is also a part of the embodiments described in the present disclosure.

First Embodiment

Figure 1:
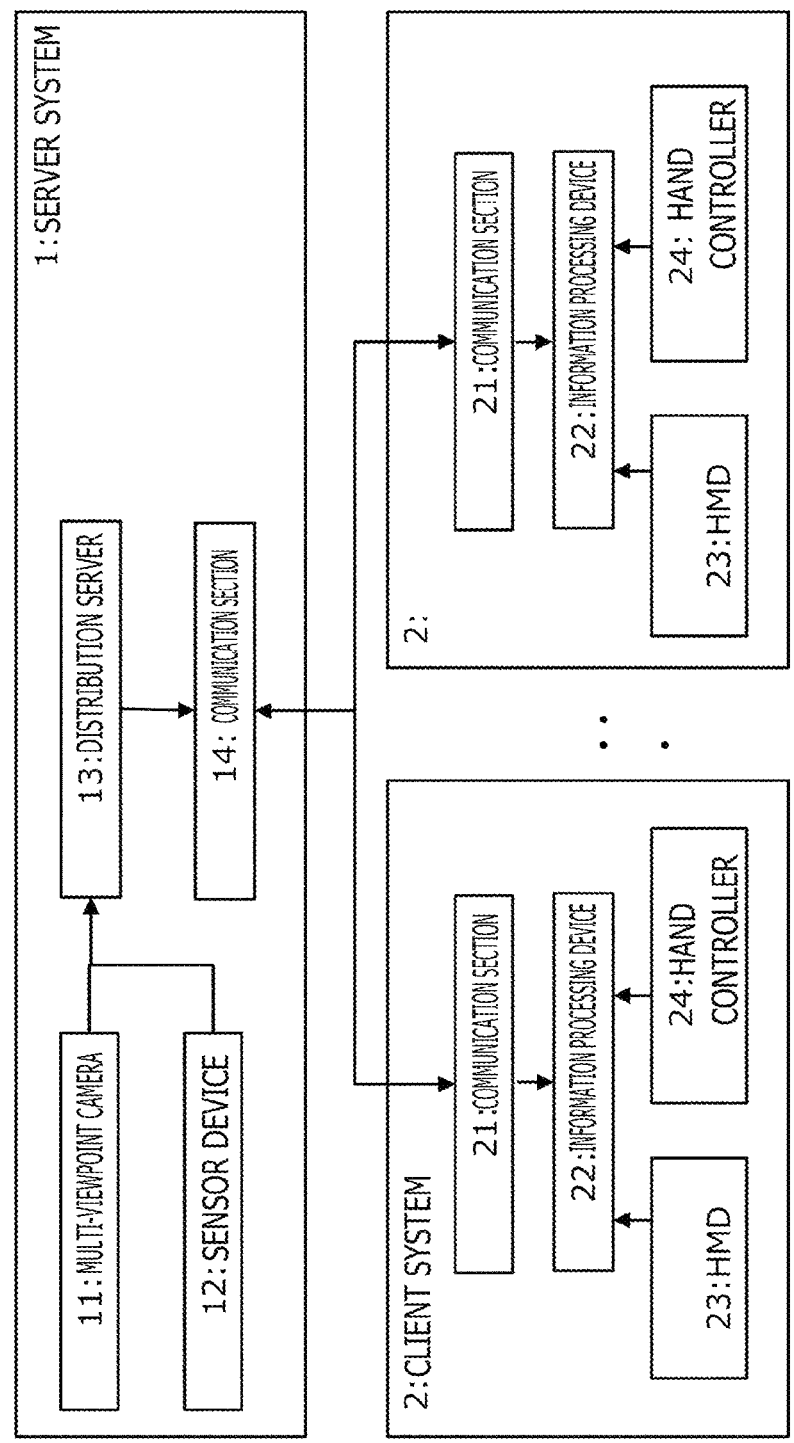
FIG. 1 is a block diagram schematically depicting the entire configuration of an information distribution system according to a first embodiment.

FIG. 1 is a block diagram schematically depicting the entire configuration of an information distribution system according to the first embodiment. A server system 1 set on a content distributer side and a plurality of client systems 2 set on a plurality of content viewers (users) side are connected over a communication network. The server system 1 and the plurality of client systems 2 perform bidirectional communication. The communication network may be a wide area network such as the internet, or may be a local area network such as a wireless LAN (local area network) or Ethernet (registered trademark).

The server system 1 includes a multi-viewpoint camera 11, a sensor device 12, a distribution server 13, and a communication section 14. The multi-viewpoint camera 11 includes a plurality of cameras (image pickup devices) that shoots a performer from multiple viewpoints. For example, the cameras are RGB cameras. The multi-viewpoint camera 11 shoots a performer from the multiple viewpoints at a fixed time interval (frame interval), and provides, to a distribution server 3, the obtained images which are associated with respective photographing times.

Figure 2:
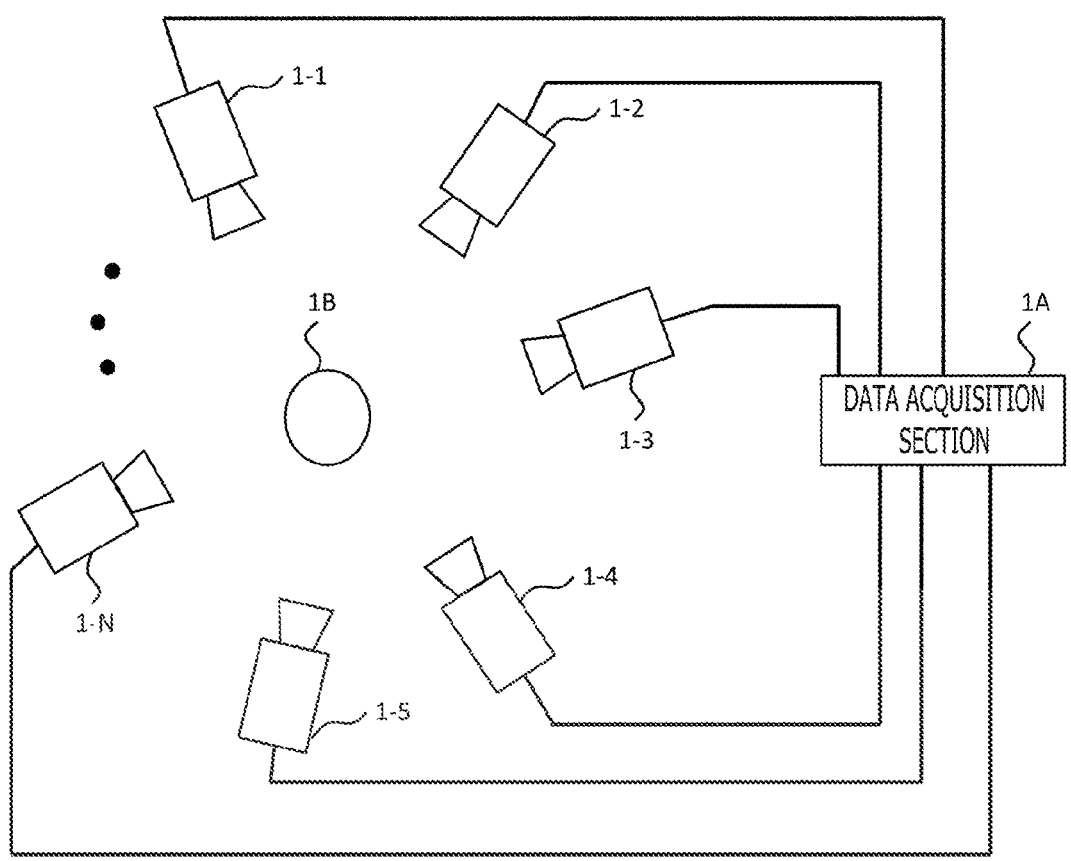
FIG. 2 is a diagram depicting an example where a performer is shot with a plurality of image pickup cameras corresponding to multiple viewpoints.

FIG. 2 depicts an example where a performer is shot with a plurality of image pickup cameras 1-1 to 1-N corresponding to multiple viewpoints. The distribution server 13 includes a data acquisition section 1A. The image pickup cameras 1-1 to 1-N are positioned so as to surround a subject 1B which is a performer. The image pickup cameras 1-1 to 1-N are placed so as to be directed toward the subject 1B. The image pickup cameras 1-1 to 1-N are previously calibrated to obtain camera parameters. The image pickup cameras 1-1 to 1-N shoot the subject 1B from the respective positions, and acquire N captured images (RGB images).

The sensor device 12 includes one or more sensors that sense a performer. The sensor device 12 includes one or more sensors that respectively detect performer's body position information (e.g. position information regarding a plurality of body parts including a head, a chest, arms, hands, elbows, knees, and legs). These sensors are acceleration sensors and gyrosensors that are mounted on the performer body, for example. Alternatively, the sensors are depth sensors that are placed around the performer and each measure the distance to the performer. Examples of the depth sensors include stereo cameras, TOF cameras, and LIDAR cameras. Alternatively, as the sensors, infrared cameras may be placed in the surrounding area of the performer body on which an IR marker is disposed. In a case where the sensors are depth sensors, infrared cameras, or the like, the sensor device 12 may identify the position of each body part by analyzing images obtained by the sensors through semantic segmentation. The sensor device 12 provides, to the distribution server 13, the performer's body position information detected by the sensors in association with the respective times.

The distribution server 13 generates a three-dimensional model (performer avatar) of the performer on the basis of a plurality of captured images obtained by the multi-viewpoint cameras 11. For example, a Visual Hull method can be used to generate the three-dimensional model. That is, the differences of multi-viewpoint images of a subject from an image of the background in a photography studio are used to generate silhouette images of the subject through background difference processing. For example, the silhouette image is provided by binarizing a silhouette that indicates a range including the subject in each captured image. Each of the silhouette images are reversely projected to the original three-dimensional space, and an intersection portion of the respective visual volumes of the silhouette images is obtained as a Visual Hull. A marching cube method or the like is applied to voxel data of the Visual Hull, whereby a plurality of meshes are created. The three-dimensional positions of the points (Vertexes) constituting the meshes and geometry information (Geometry) indicating the link (Polygon) among the points are created as three-dimensional shape data (polygon model). Texture mapping of superimposing corresponding images on the meshes of the three-dimensional shape data is performed. Accordingly, the three-dimensional model is obtained.

The distribution server 13 creates content information (content data) by synchronizing the three-dimensional model and the body position information with each other on the basis of the photographing time of the three-dimensional model and the detection time of the body position information. For example, as a result of the synchronization between the three-dimensional model and the body position information, the position of each part of the three-dimensional model (e.g. the position of the head, the position of an eye, the position of a hand or leg) is identified in each frame. The distribution server 13 may further associate sound information with the content information. Examples of the sound information include a voice of the performer, a musical instrument sound, an effective sound, and the like. The distribution server 13 stores the content information in an internal or external storage.

In a case where a content distribution condition is satisfied, the distribution server 13 reads out the content information from the storage, and distributes the read content information to the client systems 2 of viewers via the communication section 14. Examples of the content distribution condition include a condition that a previously designated time has come, and a condition that an operator inputs a distribution instruction.

The communication section 14 communicates with a communication section 21 of each of the client systems 2 over a communication network such as the internet. The communication section 14 transmits the content information that the distribution server 13 has read out from the storage, to a plurality of the client systems 2 (for example, by streaming distribution). The content information may be distributed to the client systems 2 at the same time, or may be distributed to the client systems 2 at different timings. The distribution server 13 may perform real-time distribution of the content information such that the content information is generated and distributed concurrently with the shooting of the performer.

Each of the client systems 2 includes the communication section 21, an information processing device 22, an HMD (head mount device) 23, and a hand controller 24. The communication section 21 receives the content information by communicating with the communication section 14 of the server system 1.

The HMD 23 is wiredly or wirelessly connected to the information processing device 22. The HMD 23 is a head device that is mounted on the head of a user (viewer), and provides a virtual space to the viewer on the basis of the content information provided from the server system 1. For example, the HMD 23 is an XR viewing device such as a VR (virtual reality) head mounted device, AR (augmented reality) glasses, or MR (mixed reality) glasses. The HMD 23 includes a CPU that executes a variety of computation processes, a monitor, different types of sensors, a storage, and the like.

The HMD 23 includes a monitor on which a right eye image and a left eye image are displayed. When the eyes of the viewer recognize the respective images, the viewer recognizes the images as a three-dimensional image on the basis of the parallax of both eyes. The images to be displayed on the monitor are provided from the information processing device 22. For example, the monitor is a non-transmission type display device (e.g. a liquid crystal monitor, an organic EL (electro luminescence) monitor). In this case, the HMD 23 is a closed type device that covers the eyes of the viewer, and the monitor is disposed in a position, in the main body of the HMD 23, in front of the eyes of the viewer. Alternatively, the monitor may be a transmission type display. In this case, the HMD 23 is an open type like eyeglasses. The monitor may include a section that displays a portion of an image constituting the virtual space and a real space at the same time. By visually recognizing the three-dimensional image displayed on the monitor, the viewer is immersed into the virtual space. The virtual space includes a performer avatar (three-dimensional model), background objects, an object that can be operated by the viewer, and an object of a menu selectable to the viewer, for example.

The HMD 23 may include a sensor for position detection. By using the sensor for position detection, the HMD 23 detects the position and inclination (attitude) of the HMD 23 and the position and inclination (attitude) of the head of the viewer. For example, the sensor for position detection includes at least one of an angular speed sensor, a geomagnetic sensor, and an acceleration sensor. The HMD 23 may provide information regarding the detected position and inclination to the information processing device 22. In place of the HMD 23, the information processing device 22 may perform a process of detecting the position and inclination of the HMD 23.

The HMD 23 may include a visual line sensor that detects a direction to which the visual line of the right and left eyes of the viewer is directed. The direction of the visual line is detected by an eye tracking function, for example. The HMD 23 may provide information regarding the detected direction of the visual line to the information processing device 22.

The HMD 23 may include at least one camera that shoots a part (e.g., a nose, a mouth, eyes, eyebrows) included in the face of the viewer. The camera may be provided inside a casing body of the HMD 23, or may be provided outside the casing body. The HMD 23 may provide data on an image taken by the camera, to the information processing device 22.

The HMD 23 may include a microphone that converts a speech made by the viewer to a sound signal (an electric signal). The HMD 23 may provide the sound signal obtained as a result of the conversion by the microphone, to the information processing device 22. Further, the HMD 23 may include a loudspeaker that converts a sound signal (e.g. a voice signal or a music sound of the content) to a sound, and outputs the sound to the viewer. An earphone can be used as the loudspeaker. The sound signal may be provided from the information processing device 22, for example. Alternatively, the sound signal may be previously stored in the storage of the HMD.

The hand controller 24 is wiredly or wirelessly connected to the information processing device 22. The hand controller 24 receives a command input from the viewer. The hand controller 24 is formed so as to be holdable to the viewer, or mountable on a portion of a body or clothes. The hand controller 24 may be configured to output at least any one of a vibration, a sound, and light on the basis of a signal sent from the information processing device 22. A command that the viewer inputs to the hand controller 24 may be an operation for controlling the position or motion of an object placed in the virtual space.

The hand controller 24 may include a sensor for position detection. By using the sensor for position detection, the hand controller 24 detects the position and inclination (attitude) of the hand controller 24. For example, the sensor for position detection includes at least one of an angular speed sensor, a geomagnetic sensor, and an acceleration sensor. In place of the hand controller 24, the information processing device 22 may perform a process of detecting the position and inclination of the hand controller 24.

Figure 3:
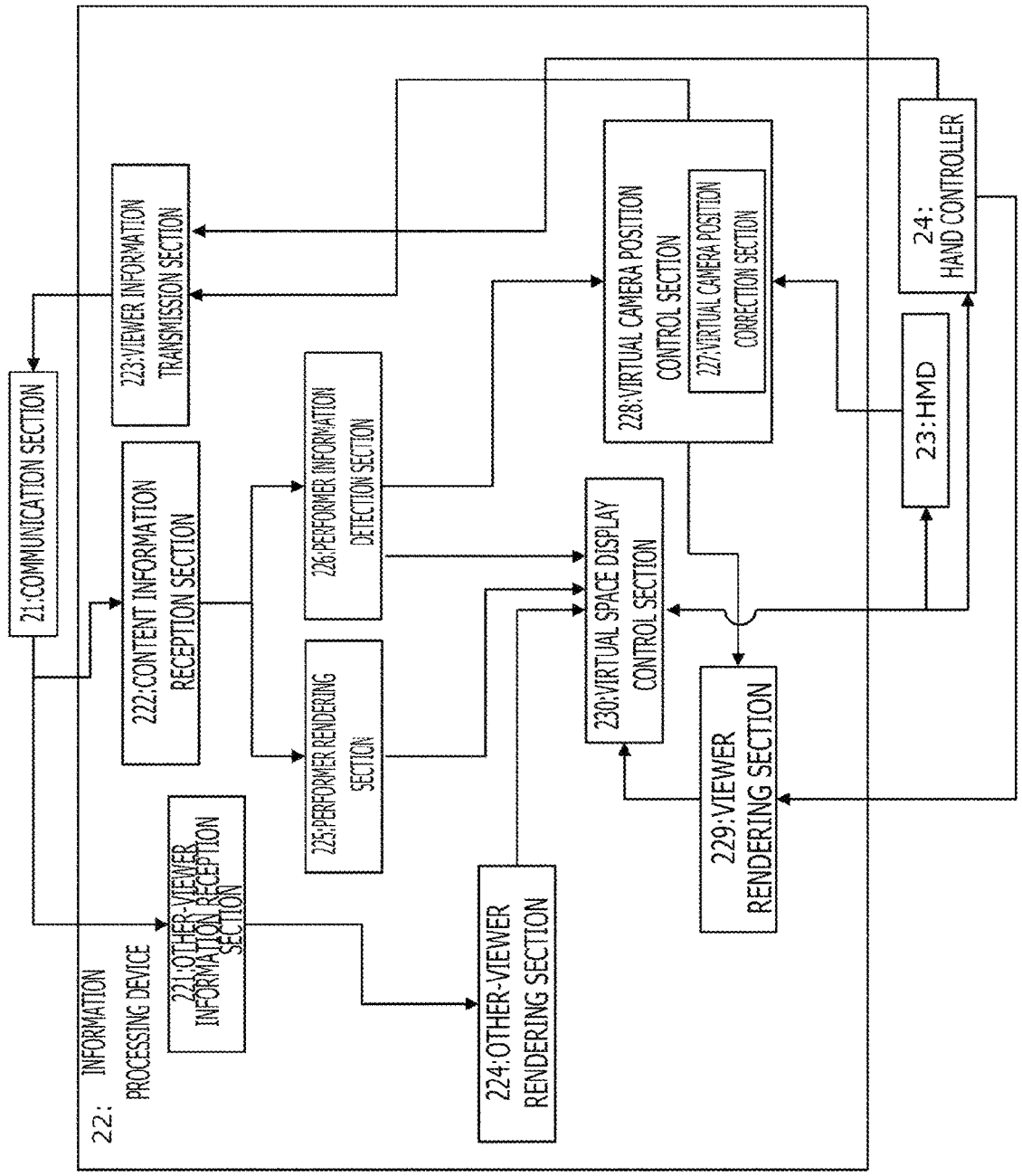
FIG. 3 is a block diagram of an information processing device installed in each client system.

FIG. 3 is a block diagram of the information processing device 22 which is installed in each client system. The information processing device 22 includes an other-viewer information reception section 221, a content information reception section 222, a viewer information transmission section 223, an other-viewer rendering section 224, a performer rendering section 225, a performer information detection section (detection section) 226, a virtual camera position control section 228, a viewer rendering section 229, and a virtual space display control section (control section) 230. The virtual camera position control section 228 includes a virtual camera position correction section (correction section) 227.

A part or all of these sections of the information processing device 22 may be configured by hardware, software, or a combination thereof. By way of example, the hardware includes a dedicated circuit or a processor such as a CPU. The information processing device 22 may include a storage such as a memory or a hard disk for storing information or data. The information processing device 22 may further include a timer that counts a time.

The virtual camera position control section 228 acquires information regarding the position and attitude of the head of the viewer detected by the HMD 23. The virtual camera position control section 228 determines the position and attitude of a camera (a virtual camera linked with the viewer) indicating the viewpoint of the viewer in the virtual space on the basis of the information acquired from the HMD 23. The virtual camera is also referred to as a user's viewpoint camera. The virtual camera position control section 228 the position and attitude of the virtual camera correspond to the position and attitude of the head of the viewer avatar in the virtual space. An image of a prescribed angle range with respect to the position and attitude of the virtual camera in the virtual space is presented to the viewer wearing the HMD 23. When at least one of the position and attitude of the virtual camera is changed, the image being presented to the viewer is changed. In a case where multi-angle viewpoints are enabled, the virtual camera can be placed at an optional elevation angle within the 360-degree range surrounding the performer.

The content information reception section 222 receives the content information from the server system 1. The content information reception section 222 provides the content information to the performer rendering section 225 and the performer information detection section 226.

The performer information detection section (detection section) 226 detects information on the performer (performer avatar) in the virtual space on the basis of the content information. For example, the standing position, the head position and inclination (face angle) of the performer avatar, the height and the direction of the visual line of the performer avatar, and the like are detected. Body position information included in the content information can be used to detect the information on the performer. Alternatively, image analysis (e.g. semantic segmentation or the like) of a three-dimensional model may be conducted to detect the information on the performer.

The viewer rendering section 229 renders an avatar indicating the viewer in the virtual space on the basis of the position and attitude of the virtual camera (the position and attitude of the head of the viewer), the position and attitude of the hand controller 24 (information regarding the position and attitude of a viewer's hand). The whole body of the avatar may be rendered, or a part (e.g. the head or both hands) of the avatar may be rendered. In a case where the viewer avatar is refrained from being displayed in the virtual space, generation of the avatar can be omitted. Both the positions and attitudes of the virtual camera and the hand controller 24 have been used, but only the positions may be used. The position and attitude of the head of the viewer avatar to be rendered, depend on the position and attitude of the virtual camera. Also, the position and attitude of both hands or one hand of the viewer avatar to be rendered, depend on the position and attitude of the hand controller 24.

The other-viewer information reception section 221 receives viewer information (other-viewer information) regarding another viewer from the server system 1 or another client system 2. The other viewer information includes information (viewer ID) for identifying the other viewer, and the position and attitude of the head and the position and attitude of the hand of the other viewer avatar in the virtual space, for example. The other-viewer information reception section 221 provides the other-viewer information to the other-viewer rendering section 224.

The other-viewer rendering section 224 renders an avatar (other viewer avatar) representing the other viewer in the virtual space on the basis of the other-viewer information.

The performer rendering section 225 renders an avatar (performer avatar) representing the performer in the virtual space on the basis of the content information.

The viewer information transmission section 223 transmits viewer information including the information regarding the user (viewer) to either one or both of the server system 1 and the other client system 2. The viewer information includes information (viewer ID) for identifying the viewer, information regarding the position and inclination of the virtual camera of the viewer, and information regarding the position and inclination of the hand controller 24. The viewer information transmission section 223 transmits the viewer information at a fixed time interval, for example. Alternatively, the viewer information transmission section 223 transmits the viewer information only when there is a change in the position or attitude of the viewer's head, or the viewer information transmission section 223 transmits the viewer information only when there is a change in the position and attitude of the hand. When receiving the viewer information from the client system 2, the distribution server 13 of the server system 1 transmits the received viewer information as other viewer information to the other client system 2.

The virtual space display control section 230 places the virtual camera in a position, in the virtual space, determined by the virtual camera position control section 228. In addition, the virtual space display control section 230 places the rendered viewer avatar, the rendered other viewer avatar, and the rendered performer avatar in the virtual space.

In addition, the virtual space display control section 230 may place another object which is a background object, for example, in the virtual space. For example, in a case where the content indicates a music live concert conducted by a musician, an avatar of the user (viewer) and an avatar of the other viewer are included in an audience in a concert hall in the virtual space. The performer avatar represents a musician in the virtual space. The background includes a stage, seats, lights, walls, the floor, and the like in the concert hall in the virtual space.

The virtual space display control section 230 generates an image on the basis of at least one of the position and attitude of the virtual camera, and displays the image on the monitor of the HMD 23. The position and attitude of the virtual camera are based on the position and attitude of the HMD 23.

The content may be recorded content obtained by prior shooting, or may be real-time distribution content of generating and distributing content information concurrently with the shooting.

In the following explanation, the performer avatar and the viewer avatar may be expressed as performer in the virtual space and viewer in the virtual space, respectively.

The virtual space display control section 230 may make a determination as to a collision between avatars (or between an avatar and a background object), and may perform control according to the result of the determination. For example, in a case where a hand of the viewer avatar collides with a hand of the other viewer avatar, the virtual space display control section 230 may generate a command signal for vibrating the hand controller 24, and output the generated command signal to the hand controller 24. Accordingly, the viewer wearing the HMD 23 can feel that a hand of the viewer hits a hand of the other viewer.

The virtual space display control section 230 provides, to the HMD 23, data on an image viewed from the virtual camera in the virtual space. The HMD 23 displays the image data on the monitor. When the viewer moves the head on which the HMD 23 is mounted, or a hand (the hand controller 24), the head (virtual camera) or the hand of the viewer avatar also synchronously moves in the virtual space. The viewer avatar moves like an alter ego of the viewer. In a case where the face of the performer avatar is just opposed to the face of the viewer avatar, the viewer wearing the HMD 23 can recognize that the eyes of the viewer and the performer have met (their visual lines are opposed to each other) in the virtual space. A case where the faces are just opposed to each other means a case where the height of the visual line of the performer avatar matches the height of the visual line of the virtual camera (the visual line of the viewer avatar), and further, the visual lines of the performer avatar and the viewer avatar are opposed to each other, for example.

The virtual camera position correction section 227 corrects the position of the virtual camera on the basis of the position of the performer in the virtual space (i.e. the position of the performer avatar) and the position of the viewer in the virtual space (i.e. the position of the viewer avatar). By way of example, the virtual camera position correction section 227 corrects the position of the virtual camera (the position of the visual line of the viewer avatar) on the basis of first information regarding the height of the visual line of the performer in the virtual space and second information regarding the height of the virtual camera linked with the viewer in the virtual space. By way of example, the height of the virtual camera of the viewer (the height of the visual line of the viewer) is adjusted to match the height of the visual line of the performer. In addition, the angle of the virtual camera of the viewer (the angle of the visual line of the viewer) is adjusted to the angle of the visual line of the performer (for example, the visual line of the viewer is directed to the eyes or another part of the face of the performer). By way of example, the position of the virtual camera is corrected in a case where a condition for matching the visual lines of the performer avatar and the viewer avatar is satisfied such as a case where the distance between the performer avatar and the viewer avatar becomes equal to or shorter than a prescribed distance, or a case where a predetermined scene of the content has started. In a case where the position of the virtual camera is corrected by the virtual camera position correction section 227, the virtual camera position control section 228 determines the corrected position as the position of the virtual camera. Accordingly, the visual line of the performer and the visual line of the viewer are adjusted to be opposed to each other in the virtual space. In this manner, the present embodiment simulates a user's experience of gaze meeting with the performer by correcting the position of the virtual camera in, for example, a case where the performer and the user (viewer) get close to each other in the virtual space.

Figure 4:
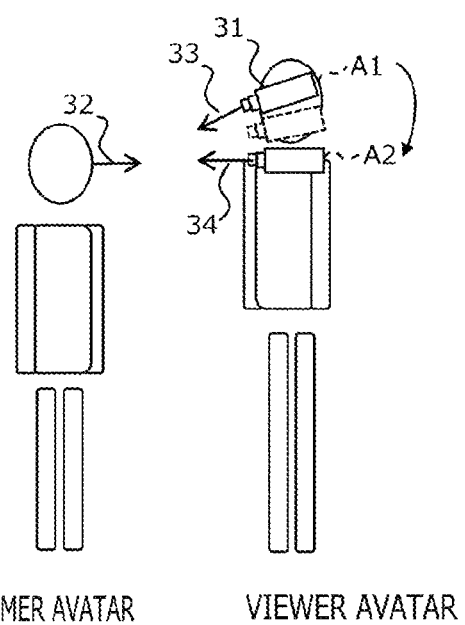
FIG. 4 is a diagram for explaining the principle of implementing gaze meeting by correcting the position of a virtual camera.

FIG. 4 is a diagram for explaining the principle of implementing gaze meeting (visual line matching) between a performer and a viewer by correcting the position and attitude of a virtual camera. In FIG. 4, a performer avatar is disposed on the left side while a viewer avatar is disposed on the right side (the avatars are stationary) in a virtual space. In a state A1, a virtual camera 31 is disposed in a prescribed position on the head of the viewer avatar so as to be directed to the face of the performer. The angle of the virtual camera 31 corresponds to the direction of the visual line of the viewer. Since the performer avatar is just directed to the right direction in the drawing, a visual line 32 of the performer avatar is not opposed to a visual line 33 of the viewer avatar. That is, the heights of these visual lines are different, and further, the directions of the visual lines are not opposed to each other. The virtual camera 31 is moved from the state A1 to a state A2. That is, the height of the virtual camera 31 is lowered to the height of the visual line 32 of the performer avatar such that the virtual camera faces the visual line 32 of the performer avatar. Accordingly, a visual line 34 of the viewer avatar is opposed to the visual line 32 of the performer avatar, so that a gaze meeting experience can be given to the viewer.

Hereinafter, operation of the information processing device 22 of the client system 2 according to the present embodiment will be explained in detail with reference to FIGS. 5, 6, 7, 8, 9, 10A, 10B, 10C, and 10D.

Figure 5:
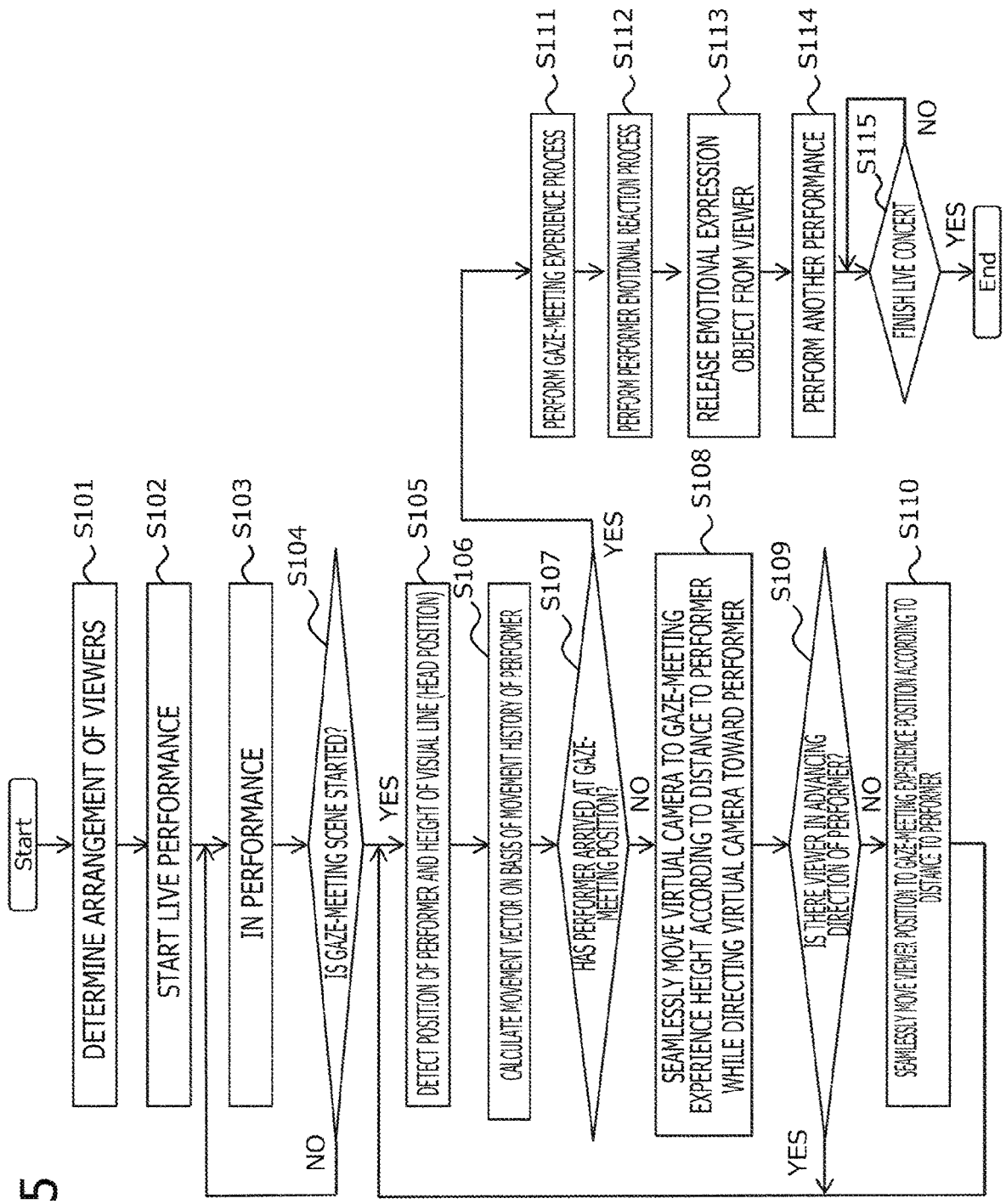
FIG. 5 is a flowchart of one operation example of an information processing device of a client system according to the present embodiment.
Figure 6:
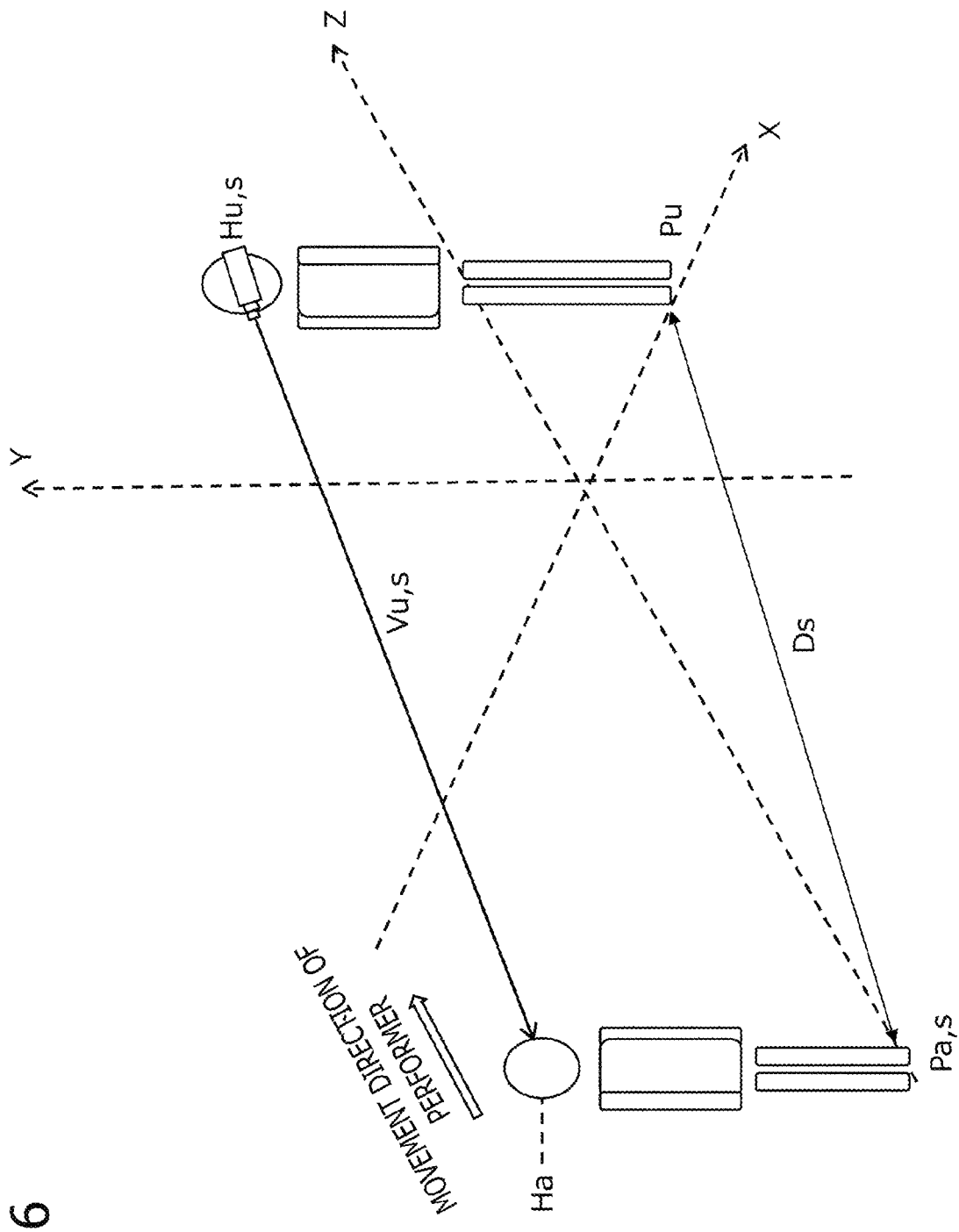
FIG. 6 is a diagram for explaining a process of adjusting the visual line of a performer and the visual line of a viewer to be opposed to each other in a virtual space.
Figure 7:
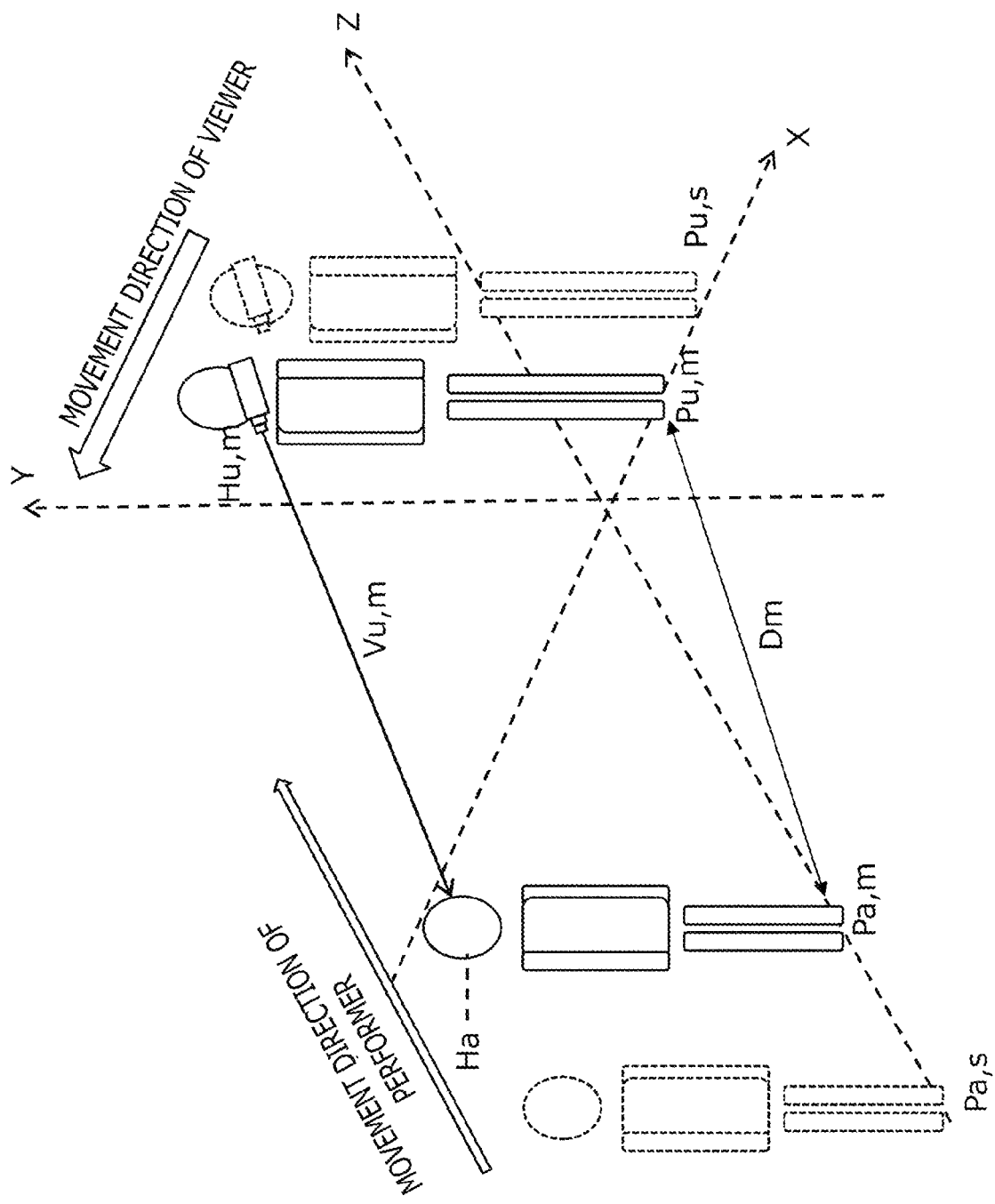
FIG. 7 is a diagram for explaining a process of adjusting the visual line of a performer and the visual line of a viewer to be opposed to each other in a virtual space.
Figure 8:
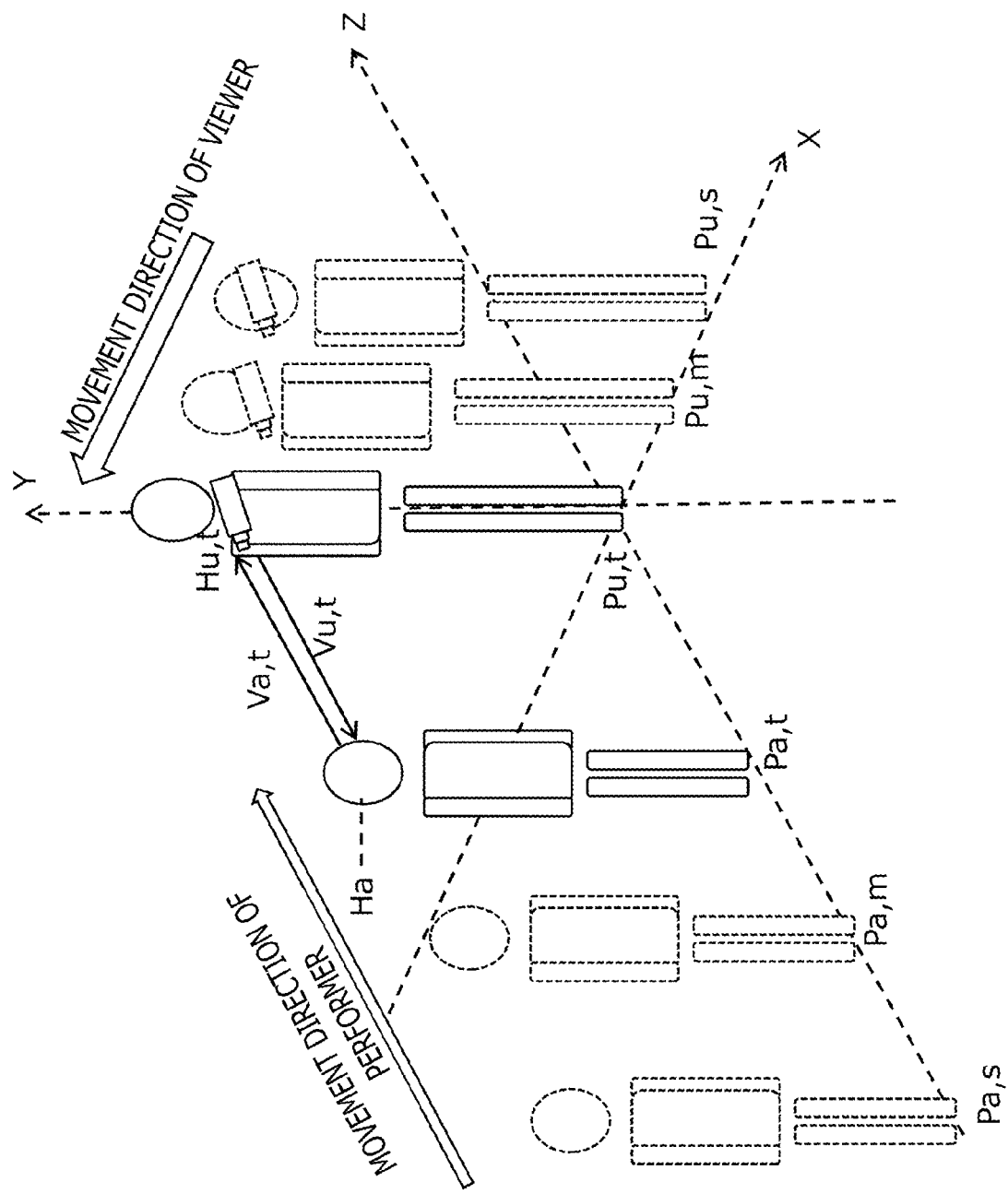
FIG. 8 is a diagram for explaining a process of adjusting the visual line of a performer and the visual line of a viewer to be opposed to each other in a virtual space.

FIG. 5 is a flowchart of one operation example of the information processing device 22 of the client system 2 according to the present embodiment. FIGS. 6, 7, and 8 are diagrams for explaining a process of adjusting the visual line of a performer to be opposed to the visual line of a viewer in a virtual space. FIG. 9 is a diagram for explaining a process of correcting the position and attitude of a virtual camera of a viewer in a virtual space. FIGS. 10A, 10B, 10C, and 10D depict diagrams schematically depicting an example of an image (three-dimensional image) of a virtual space that is presented to a viewer who is wearing an HMD.

The virtual space display control section 230 determines the position of the user (viewer) in the virtual space (live concert space), and disposes the viewer avatar in the virtual space which is an XYZ coordinate system (S101). Another viewer avatar is also placed in the virtual space (S101). Further, background objects such as a stage and lights and any other objects are placed (S101). Content information is received from the server system 1, and a music live concert is started in the virtual space (S102). The virtual space display control section 230 places a performer object in the virtual space (S103). The virtual space display control section 230 controls display of the performer, the viewer, and the other viewer, and also controls output of sounds (S103). The sounds include a song of the performer object, accompaniment of the song, voices of the viewer and the other viewer, and the like.

The virtual space display control section 230 determines whether or not a gaze-meeting scene is started (S104). The gaze-meeting scene involves a process of adjusting the visual line of the performer and the visual line of the viewer to be opposed to each other in the virtual space. For example, in the gaze-meeting scene, the performer comes near the viewer by walking toward the viewer while singing a song in the virtual space. The gaze-meeting scene may be previously determined to a predetermined time range of recorded content. When the start time of the predetermined time range comes, it is determined that the gaze-meeting scene is started. Alternatively, the gaze-meeting scene may be determined to a time period during which the performer is in a prescribed spatial range of the virtual space. Alternatively, the gaze-meeting scene for each viewer may be determined to a scene in which the distance to the viewer is equal to or shorter than a threshold. In the gaze-meeting scene, the distance between the performer and the viewer is short. When a process of adjusting the visual line of the viewer and the visual line of the performer to be opposed to each other is performed, the viewer feels that the eyes of the performer and viewer naturally have met (the performer notices the viewer). Accordingly, the viewer can get a special feeling.

FIG. 6 depicts a situation in which the gaze-meeting scene is started in the virtual space. In the virtual space based on XYZ axes, the distance between the performer and the viewer is defined as Ds. The performer is positioned in a position Pa,s, and the viewer is positioned in a position Pu,s. Ha represents the height of the visual line of the performer. Hu,s represents the height of the visual line of the viewer (virtual camera). The direction of the visual line of the viewer is indicated by a visual line vector Vu,s. It is to be noted that the direction of the visual line of the performer is detected by the performer information detection section 226. By way of example, the direction of the visual line of the performer matches the movement direction of the performer.

FIG. 9 indicates the relation between the position Pu,s of the viewer and the height Hu,s of the virtual camera in FIG. 6, in the virtual space based on the XYZ axes. The virtual camera is directed toward the performer. It is to be noted that the scale of FIG. 9 is different from those of FIGS. 6 to 8.

FIG. 10A indicates an example of a three-dimensional image that is presented to the viewer wearing the HMD 23 in the state in FIG. 6. In the virtual space, the performer faces the front right side when viewed from the viewer. Since the virtual camera is directed toward the performer, the performer is displayed in roughly the center of the monitor of the HMD.

In a case where the gaze-meeting scene is not started, the flow returns to step S103. In a case where the gaze-meeting scene is started, the flow proceeds to step S105.

The performer information detection section 226 detects the position (standing position) of the performer avatar, the head position (the height of the visual line) of the performer avatar, and the face angle (or the direction of the visual line) of the performer avatar (S105). In the example in FIG. 6, the position Pa,s of the performer and the height Ha of the visual line are detected. Detection of the face angle (or the direction of the visual line) may be omitted in a case where the face angle (or the direction of the visual line) is considered to be identical to the movement direction of the performer or to be in a direction having a fixed relation with the movement direction, for example.

The virtual camera position control section 228 (or the virtual camera position correction section 227) calculates a movement vector of the performer on the basis of a movement history (track of the standing position) of the performer in the virtual space. For example, a vector connecting the adjacent two standing positions is determined as the movement vector of the performer. The movement vector shows the advancing direction of the performer.

The virtual space display control section 230 determines whether the performer has arrived at a gaze-meeting position Pa,t (see FIG. 8) in the virtual space (S107). The gaze-meeting position Pa,t is a performer position where the visual line of the performer is opposed to the visual line of the viewer in the virtual space. The gaze-meeting position Pa,t is, for example, on the front edge (an area close to the audience seats) of the stage in the virtual space. For example, in a scene where the performer comes close to the audience in the virtual space, when the performer walks toward the front edge of the stage and arrives at the gaze-meeting position, it is determined that the gaze-meeting position Pa,t has reached. The gaze-meeting position Pa,t may be previously determined in the content. Alternatively, the gaze-meeting position Pa,t may be dynamically determined to a position where the distance to the viewer is equal to or shorter than a threshold. In this case, the gaze-meeting position Pa,t may be predicted from the movement vector of the performer. A gaze-meeting region may be used as the gaze-meeting position Pa,t. In this case, the virtual space display control section 230 determines whether the performer is in the gaze-meeting region.

In a case where the performer has not arrived at the gaze-meeting position Pa,t in the virtual space, the virtual camera position correction section 227 moves the virtual camera to a gaze-meeting experience height Hu,t (see FIG. 8 which will be explained later) according to the distance between the performer and the viewer in the virtual space while directing the virtual camera toward the performer (S108). The movement is seamless (stepwise). During the movement, the attitude of the virtual camera may be seamlessly changed according to the face angle (or the direction of the visual line) of the performer. The gaze-meeting experience height Hu,t is the height of the virtual camera of the viewer at which the visual line of the performer and the visual line of the viewer are adjusted to be opposed to each other in the virtual space. By way of example, the gaze-meeting experience height Hu,t is equal to the height Ha of the visual line of the performer or falls within a fixed allowable range of the height. The gaze-meeting experience height Hu,t may be different from the height Ha of the visual line of the performer in a case where the performer is on a high stage while the viewer is on a floor lower than the stage in the virtual space, for example. In this case, the performer is caused to look at the front lower side while the viewer is caused to look up at the performer such that the visual line of the performer and the visual line of the viewer can be opposed to each other. A state where the visual lines are opposed to each other is not limited to a case where the visual line is directed to the eyes of the opponent, but includes a case where the visual line is directed to any other part (e.g. the forehead, the mouth, or the like) of the face of the opponent.

By way of example, the virtual camera position correction section 227 stepwisely corrects the height of the virtual camera of the viewer according to movement of the performer in such a way that the height of the virtual camera reaches the gaze-meeting experience height Hu,t when the performer arrives at the gaze-meeting position Pa,t. For example, each time step S108 is executed, the height of the virtual camera is increased or lowered by a predetermined amount. In this case, when the distance between the performer and the gaze-meeting position becomes equal to or less than a threshold, the height of the virtual camera may be adjusted to the gaze-meeting experience height. An adjustment rate for the height of the virtual camera may be determined on the basis of the distance between the performer and the gaze-meeting position and the movement speed of the performer, and the height of the virtual camera may be corrected by the adjustment rate. For example, a time required for the performer to arrive at the gaze-meeting position Pa,t is calculated from the distance between the performer and the gaze-meeting position and the movement speed of the performer. Further, the difference between the height of the virtual camera and the gaze-meeting experience height Hu,t is calculated. The difference is divided by the calculated time, whereby the adjustment rate is determined. The height of the virtual camera is corrected by the determined adjustment rate. The example in which the height of the virtual camera is corrected has been described so far. However, the attitude of the virtual camera may also be corrected.

The virtual camera position control section 228 (or the virtual camera position correction section 227) determines whether the viewer is present in the advancing direction of the performer in the virtual space (S109). For example, whether the viewer is present in the direction of the movement vector of the performer (whether the movement vector reaches the viewer avatar if the movement vector is extended) is determined. In a case where the movement vector reaches the viewer avatar, it is determined that the viewer is present in the advancing direction of the performer.

When it is determined the viewer is present in the advancing direction of the performer in the virtual space, the flow returns to step S105. When it is determined that the viewer is not present in the advancing direction of the performer, the virtual camera position correction section 227 moves the position of the viewer (the standing position on the XZ plane) toward a gaze-meeting experience position Pu,t (see FIG. 8 which will be explained later) according to the distance between the performer and the viewer in the virtual space (S110). The movement is seamless (stepwise). By way of example, it is assumed that the position of the viewer matches the position of the virtual camera on the XZ plane. That is, movement of the position of the viewer moves the virtual camera by the same distance as well. However, the position of the viewer on the XZ plane does not necessarily match the position of the virtual camera on the XZ plane. Also in this case, the position of the virtual camera may be moved by the same distance to the same direction according to movement of the position of the viewer. In the explanation of the present embodiment, it is assumed that the position of the viewer on the XZ plane matches the position of the virtual camera on the XZ plane. By way of example, the gaze-meeting experience position Pu,t is at a predetermined distance from the gaze-meeting position Pa,t of the performer with respect to the movement direction of the performer. Alternatively, the gaze-meeting experience position Pu,t may be previously determined in the content. The gaze-meeting experience position Pu,t may be defined in any other manner.

By way of example, the virtual camera position correction section 227 moves the position of the viewer (the position of the virtual camera) on a line connecting the position of the viewer to the gaze-meeting experience position Pu,t in the virtual space. For example, each time step S110 is executed, the position of the viewer is moved by a predetermined distance. In this case, when the distance between the gaze-meeting experience position Pu,t and the viewer becomes equal to or less than a threshold, the position of the viewer may be adjusted to the gaze-meeting experience position Pu,t. In another example, an adjustment rate for the position of the viewer may be determined on the basis of the distance between the performer and the gaze-meeting position Pa,t and the movement speed of the performer, and the position of the viewer may be corrected by the adjustment rate. For example, a time required for the performer to arrive at the gaze-meeting position Pa,t is calculated from the distance between the performer and the gaze-meeting position and the movement speed of the performer, and further, the difference between the position of the viewer and the gaze-meeting experience position Pu,t is calculated. The difference is divided by the calculated time, whereby the adjustment rate is determined. The position of the viewer (the position of the virtual camera) is corrected by the determined adjustment rate.

FIG. 7 indicates an example in which, after movement of the performer from a position Pa,s to a position Pa,m in the virtual space, correction of the height of the virtual camera of the viewer Hu,m according to the movement (S108) is completed, and movement of the position of the viewer to a position Pu,m (step S110) is completed. The height of the visual line of the viewer is at Ha which is the same height as before the movement. The height Hu,m of the visual line (virtual camera) of the viewer is lower than that in FIG. 6. It is to be noted that the direction of the visual line of the viewer is indicated by a visual line vector Vu,m. By way of example, it is assumed that the direction of the visual line of the performer matches the movement direction of the performer. However, the visual line of the performer may be directed to another direction.

FIG. 9 indicates the relation between the position Pu,m of the viewer and the height Hu,m of the virtual camera in FIG. 7. The virtual camera is directed toward the performer.

FIG. 10B depicts an example of a three-dimensional image that is presented to the viewer who is wearing the HMD 23 in the state in FIG. 7. Compared to FIG. 10A, the performer faces to a direction closer to the performer. Since the virtual camera is directed toward the performer, the performer is displayed in roughly the center of the monitor of the HMD 23.

In a case where it is determined at step S107 that the performer has arrived at the gaze-meeting position Pa,t in the virtual space, the virtual camera position correction section 227 determines whether the visual line of the performer and the visual line of the viewer are opposed to each other. In a case where the visual lines are not opposed to each other, at least one of the position and angle (attitude) of the virtual camera is adjusted such that the visual line of the viewer is opposed to the visual line of the performer (S111). In addition, the position of the viewer may be adjusted, if needed. As a result of steps S108 to S110, a state in which the visual lines are opposed to each other has been established or nearly established. Therefore, even if the process of adjusting the visual lines to be opposed to each other at once is performed at the present step S111, the viewer is not likely or less likely to feel unnaturalness.

FIG. 8 indicates a situation in which, since the performer has arrived at the gaze-meeting position Pa,t in the virtual space, correction of the height of the virtual camera of the viewer to Hu,t is completed in response to this, and further, movement of the position of the viewer to a position Pu,t is completed. The height of the visual line of the performer is at Ha which is the same height as before the movement. The height Hu,t of the visual line (virtual camera) of the viewer is lower than that in FIG. 7. The direction of the visual line of the viewer is indicated by a visual line vector Vu,t. A visual line vector Va,t of the performer is directed to the virtual camera of the viewer. The vector Vu,t of the viewer is directed to the head of the performer or to a position at the height of the visual line of the performer. That is, the visual line of the performer and the visual line of the viewer are opposed to each other, and thus, eyes of the viewer and the performer meet.

FIG. 9 indicates the relation between the position Pu,t of the viewer and the height Hu,t of the virtual camera in FIG. 8. The virtual camera is directed toward the performer.

FIG. 10C depicts an example of a three-dimensional image that is presented to the viewer who is wearing the HMD in the state in FIG. 8. The performer looks at the viewer, and thus, the eyes of the performer and the viewer meet. Since the virtual camera is directed toward the performer, the performer is displayed in roughly the center of the monitor of the HMD 23.

In a case where it is determined at step S111 that the visual line of the performer and the visual line of the viewer are opposed to each other in the virtual space or after the visual line of the performer and the visual line of the viewer are adjusted to be opposed to each other at step S111, the flow proceeds to step S112. At step S112, the virtual space display control section 230 executes a performer reaction process (emotional reaction process) in response to the gaze meeting with the viewer. For example, in a three-dimensional image being presented to the viewer, a heart mark object is superimposed on a portion near the chest of the performer. In addition, a particular effective sound or a speech (e.g. "our eyes met") may be outputted. Also, the hand controller 24 may be vibrated in a particular pattern.

FIG. 10D depicts an example in which a heart mark object is superimposed on a portion near the chest of the performer in the virtual space that is presented to the viewer who is wearing the HMD 23. Since the viewer feels that the performer notices the viewer, the viewer can get a special feeling.

In a case where the viewer reacts in response to the gaze-meeting in the virtual space, the virtual space display control section 230 displays an object (emotional expression object) corresponding to the reaction (S112). For example, a character object indicating what has been just said pleasantly by the viewer is displayed. In addition, in a case where the viewer pleasantly shakes the hand controller 24, a particular specific effective sound may be outputted or an object indicating a particular sign or a particular character string may be displayed in the virtual space.

After the eyes of the performer and the viewer meet (the visual lines are opposed to each other), the virtual space display control section 230 executes the remaining performance of the content (S114). In a case where another gaze-meeting scene is further included, the flow may return to step S104. After the content (live concert) is finished, the information processing device 22 exits the process.

According to the present embodiment, even in a case where the height of the visual line of the performer is different from the height of the visual line of the viewer in the virtual space, the position of the virtual camera is corrected, so that the visual lines can be opposed to each other. Also in a case where the visual line of the performer is directed to a direction apart from the visual line of the viewer, the attitude of the virtual camera is corrected, so that the visual lines can be opposed to each other. Also, even in a case where the movement direction of the performer is apart from a direction in which the viewer is present, the position of the virtual camera (the standing position of the viewer) is corrected, so that the visual lines can be opposed to each other. The viewer can get a special feeling since the viewer recognizes that the eyes of the viewer and the performer meet. Accordingly, the added value of the content can be enhanced. For example, a service that is impossible in real life can be provided. Moreover, according to the present embodiment, an experience of closely meeting the eyes of the performer in the virtual space can be provided to every viewer.

Second Embodiment

In the first embodiment, the position (standing position) of the viewer and the position and attitude (angle) of the virtual camera are corrected according to the advancing direction (movement direction) of the performer in the virtual space. In the second embodiment, the advancing direction of the performer is changed according to the position of the viewer, and further, the position (the height in the present embodiment) and attitude of the virtual camera of the viewer are changed. Hereinafter, the difference from the first embodiment will mainly be explained.

Figure 11:
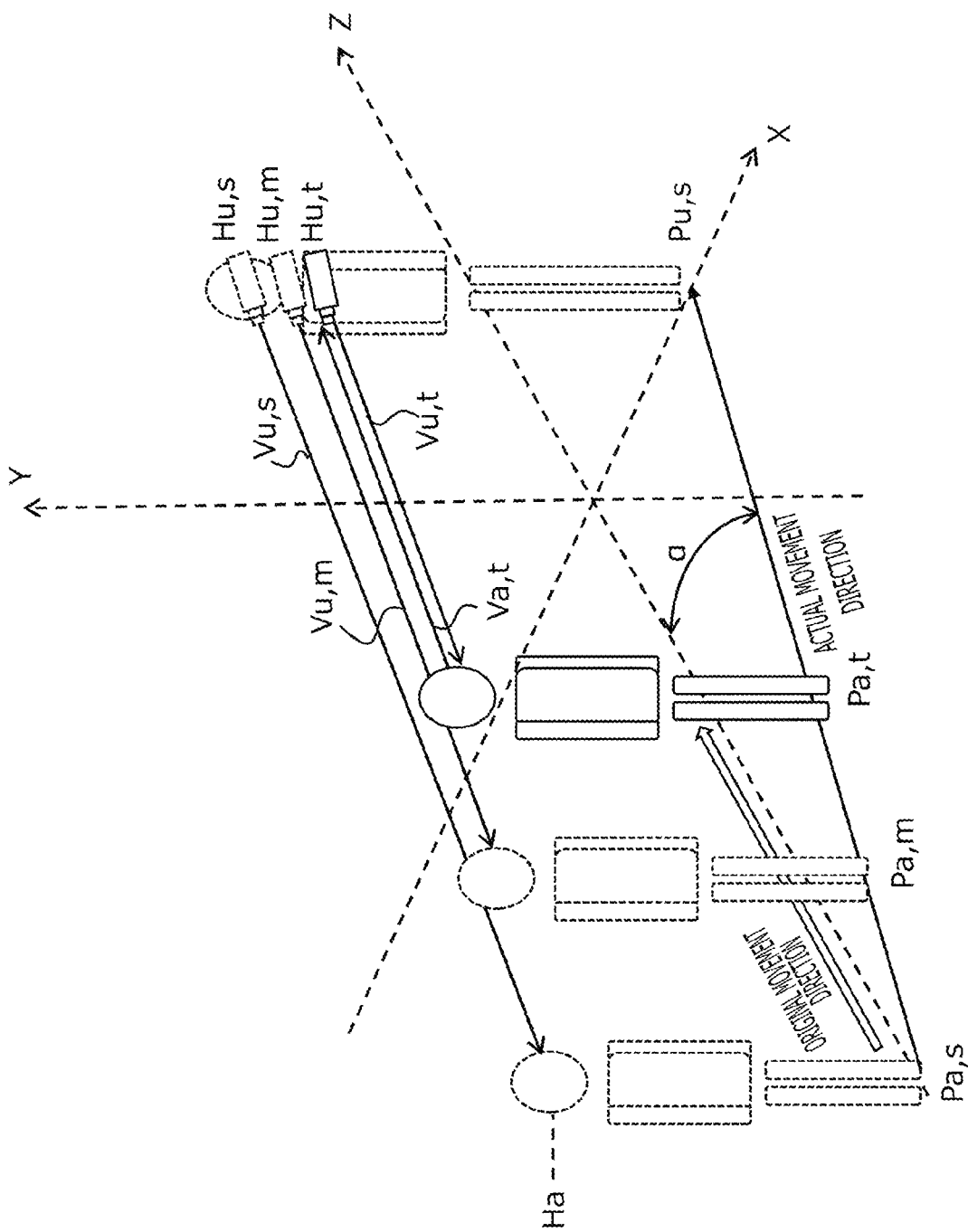
FIG. 11 is a diagram for explaining a process of adjusting the visual line of a performer and the visual line of a viewer to be opposed to each other in a virtual space.
Figure 12:
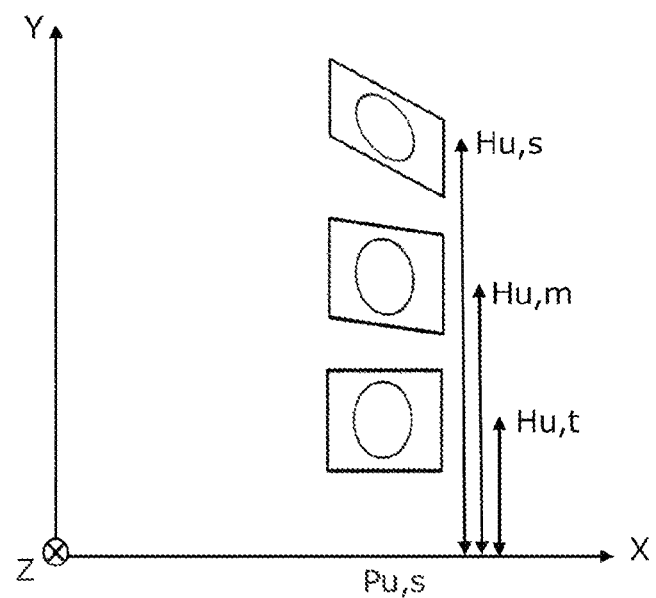
FIG. 12 is a diagram for explaining a process of correcting the position of a virtual camera of a viewer in a virtual space.

FIG. 11 is a diagram for explaining a process of adjusting the visual line of the performer and the visual line of the viewer so as to be opposed to each other in the virtual space. FIG. 12 is a diagram for explaining a process of correcting the position (height) of the virtual camera of the viewer in the virtual space.

In FIG. 11, the performer is positioned in a position Pa,s, while the viewer is positioned in a position Pu in the virtual space when a gaze-meeting scene starts. Ha represents the height of the visual line of the performer. Hu,s represents the height of the visual line (virtual camera) of the viewer. The direction of the visual line of the viewer is indicated by a visual line vector Vu,s. In the present embodiment, the standing position of the viewer remains at Pu.

The virtual space display control section 230 calculates a differential angle α (see FIG. 11) between the original movement direction (a movement direction that is determined in the content) of the performer and the direction from the viewer to the performer in the virtual space. The virtual camera position correction section 227 turns the performer by the angle α, and sets the movement direction (advancing direction) of the performer to the post-turning direction, that is, the direction in which the viewer is present. The performer is turned seamlessly (stepwisely) so as not to give a strange feeling to the viewer. The virtual space display control section 230 may turn the performer by the angle α, and then, move the performer to the post-turning movement direction. Alternatively, the virtual space display control section 230 may move the performer toward the viewer while gradually turning the performer.

In this example, it is assumed that the performer is turned by the angle α, and then, the performer is caused to move in the direction to the viewer, toward the gaze-meeting position Pa,t. In the example of FIG. 11, the gaze-meeting position Pa,t is reached via the position Pa,m and the like.

The performer information detection section 226 detects the position (standing position), the head position, the height Ha of the visual line, the direction of the visual line (or the face angle) of the performer, and the like in the same manner as in the first embodiment.

The virtual camera position correction section 227 seamlessly corrects the position (height) and attitude (angle) of the virtual camera according to the distance to the performer in such a way that the virtual camera of the viewer is directly opposed to the face (or the direction of the visual line) of the performer. A specific method for the correction may be identical to that in the first embodiment.

In the example in FIG. 11, the height of the virtual camera is changed from Hu,s to Hu,t via Hu,m. The position of the virtual camera in the X axis direction and that in the Z axis direction are unchanged (see FIG. 12).

Figure 13:
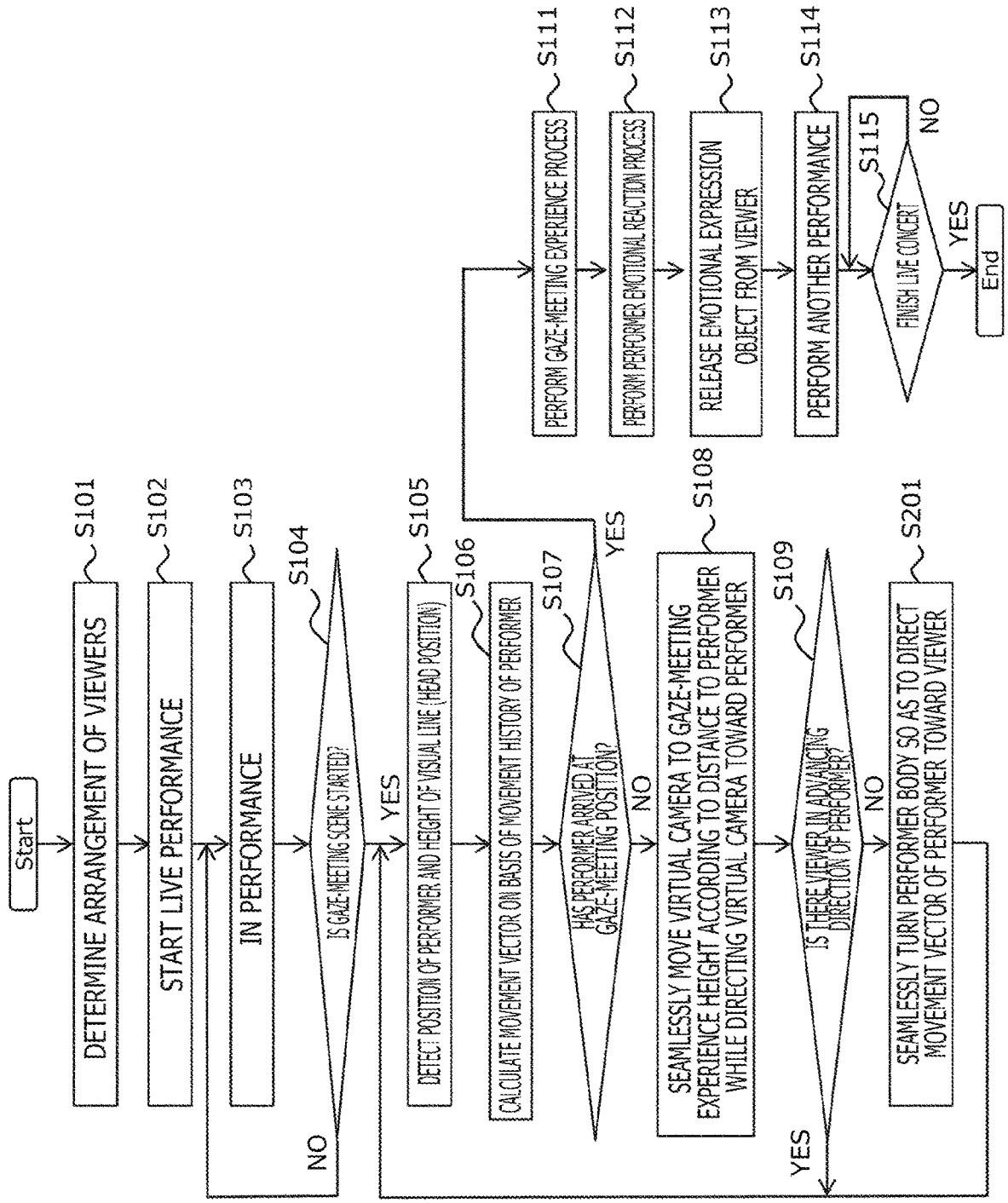
FIG. 13 is a flowchart of one operation example of an information processing device of a client system according to the present embodiment.

FIG. 13 is a flowchart of one operation example of the information processing device 22 of the client system 2 according to the present embodiment. Step S110 in FIG. 5 of the first embodiment is replaced by step S201. The remaining steps are identical to those in FIG. 5.

At step S201, the virtual space display control section 230 turns the performer by the differential angle α between the original movement direction (a movement direction that is determined in the content) of the performer and the direction from the performer to the viewer. After the turning, the viewer is present in the direction of the movement vector of the performer. The performer is turned seamlessly (stepwisely) so as not to give a strange feeling to the viewer. For example, the performer is turned by an angle of a constant rate.

According to the present embodiment, even in a case where the height of the visual line of the performer is different from the height of the visual line of the viewer in the virtual space, the position (height) of the virtual camera is corrected, so that the visual lines can be opposed to each other. Also, even in a case where the visual line of the performer is directed to a direction apart from the visual line of the viewer, the attitude of the virtual camera is corrected, so that the visual lines can be opposed to each other. Also, even in a case where the movement direction of the performer is apart from a direction in which the viewer is present, the movement direction of the performer is corrected, so that the visual lines can be opposed to each other. The viewer recognizes that the eyes of the viewer and the performer meet. Accordingly, the viewer can get a special feeling. Therefore, the added value of the content can be enhanced.

Third Embodiment

In the third embodiment, in a state where a plurality of viewers is present in a virtual space, only a viewer positioned in the movement direction of the performer is determined as a target to gain a gaze meeting experience. Hereinafter, the present embodiment will be explained in detail.

Figure 14:
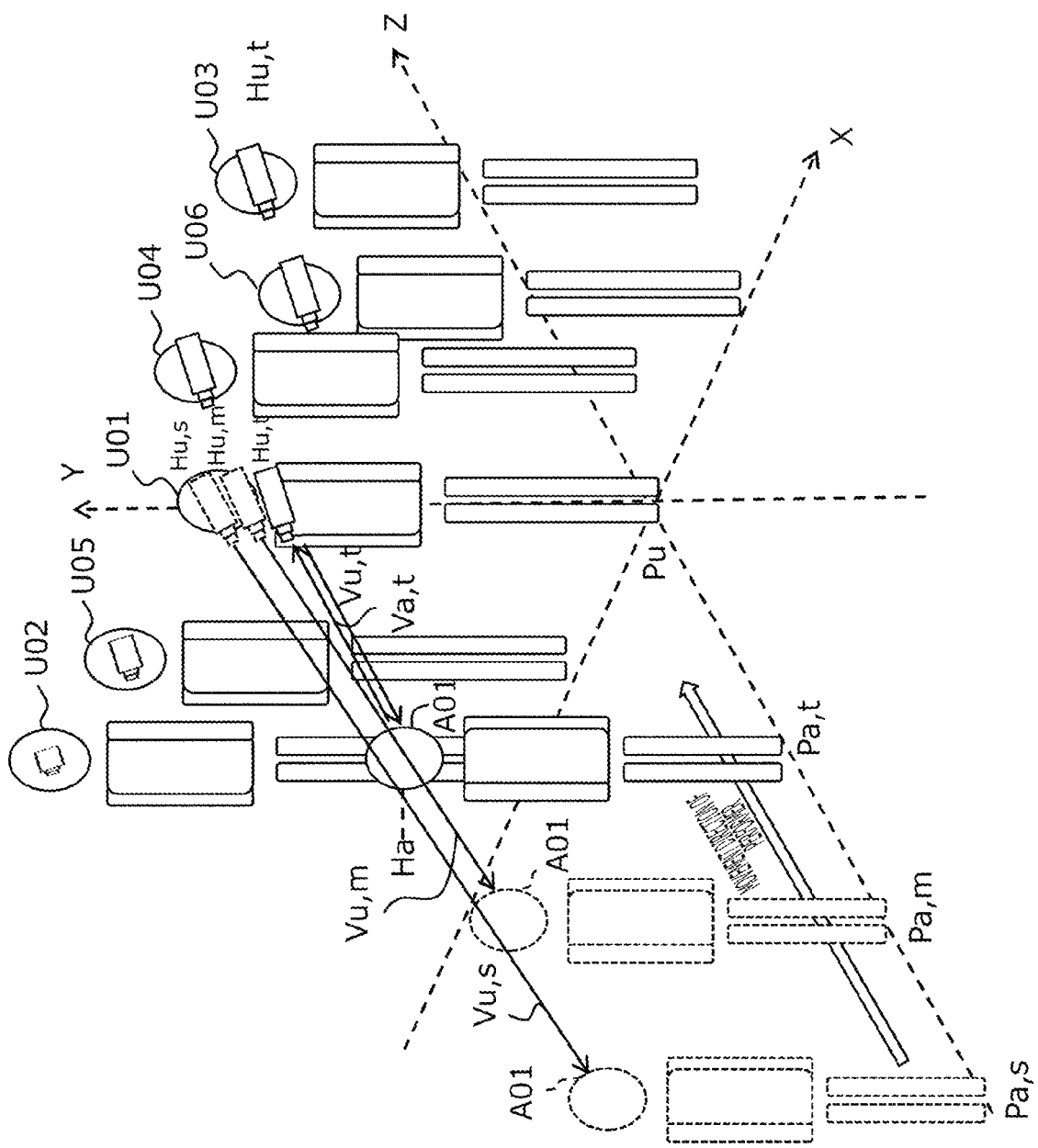
FIG. 14 is a diagram for explaining a process of adjusting the visual line of a performer and the visual line of a viewer to be opposed to each other in a virtual space.
Figure 15:
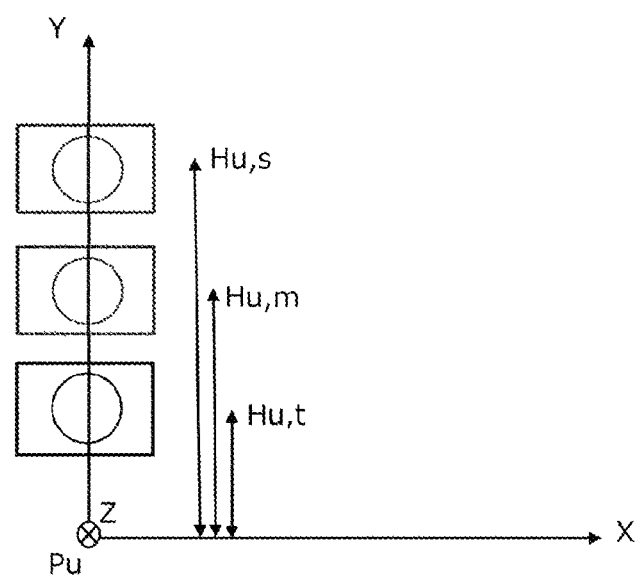
FIG. 15 is a diagram for explaining a process of correcting the position of a virtual camera of a viewer in a virtual space.

FIG. 14 is a diagram for explaining a process of adjusting the visual line of the performer and the visual line of the viewer so as to be opposed to each other in the virtual space. FIG. 15 is a diagram for explaining a process of correcting the position of the virtual camera of the viewer in the virtual space.

In FIG. 14, there are a performer A01 and a plurality of viewers U01, U02, U03, U04, U05, and U06 in the virtual space. When a gaze-meeting scene starts, the performer is positioned in a position Pa,s in the virtual space, and the viewers U01 to U06 are positioned in respective positions as depicted in the drawing (the viewer U01 is in a position Pu).

The virtual space display control section 230 determines whether a viewer (i.e. the viewer avatar of the corresponding device) is present in the movement direction of the performer A01. If the viewer is present, the virtual space display control section 230 selects the viewer. In the example in FIG. 14, only the viewer U01 is present in the movement direction of the performer A01. That is, if the movement vector of the performer A01 is extended, the vector reaches the viewer U01. In a case where the viewer U01 is the viewer avatar of the corresponding device, the virtual space display control section 230 selects the viewer U01. It is to be noted that Ha represents the height of the visual line of the performer. Hu,s represents the height of the visual line (virtual camera) of the viewer U01 when the performer A01 is positioned in the position Pa,s. The direction of the visual line of the viewer is indicated by a visual line vector Vu,s.

The virtual camera position correction section 227 seamlessly moves the position (height) of the virtual camera to a gaze-meeting experience height (e.g. the same height as the visual line of the performer) according to the distance between the performer and the viewer in the virtual space while directing the virtual camera toward the performer. If the performer reaches the position Pa,t from the position Pa,s via the position Pa,m and the like in the virtual space, the height of the virtual camera of the viewer reaches Hu,t from Hu,s via Hu,m and the like. By way of example, the value of Hu,t, the height of the visual line of the performer is equal to Ha. The position of the virtual camera in the X axis direction and that in the Z axis direction are unchanged (see FIG. 15).

Figure 16:
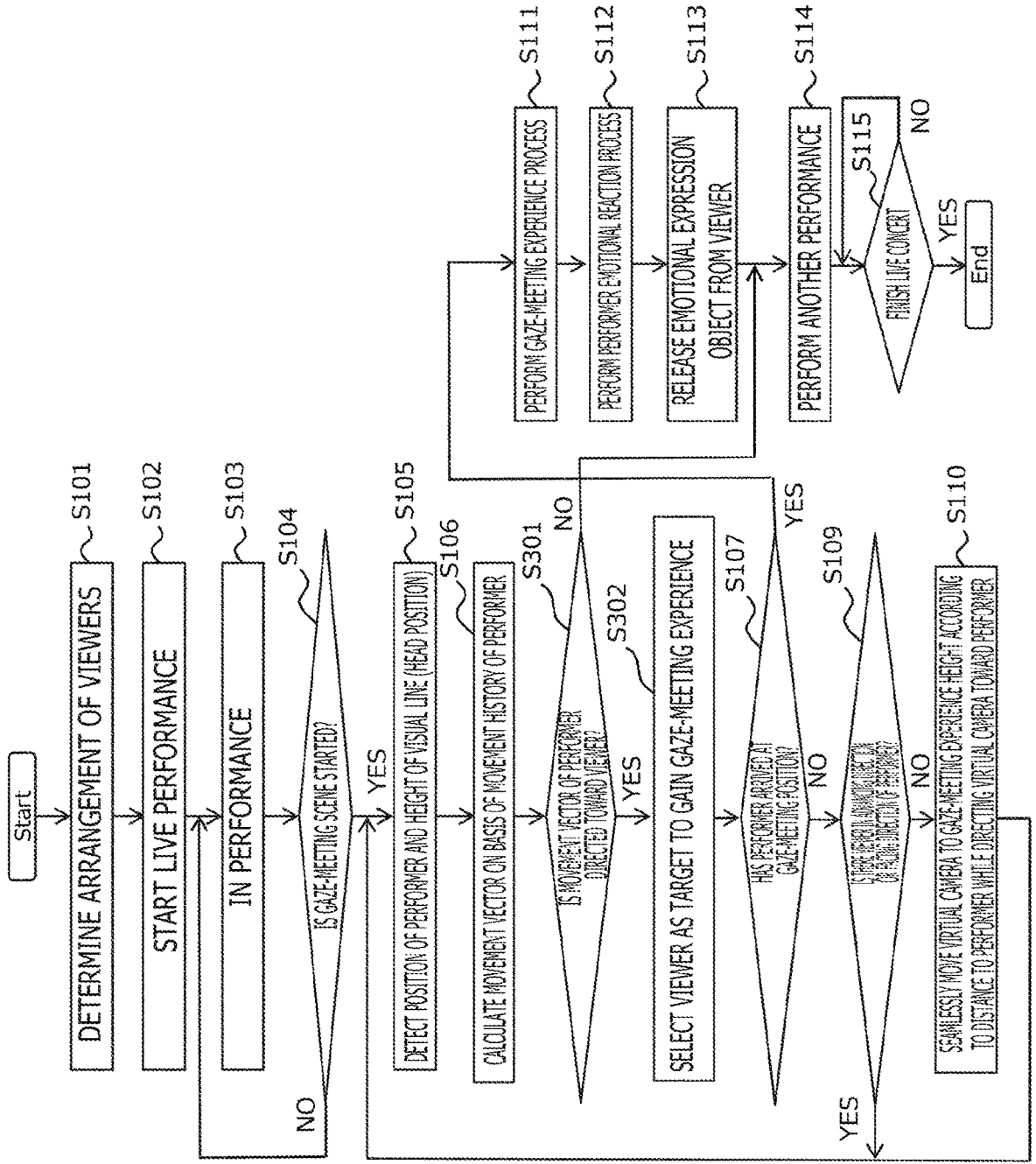
FIG. 16 is a flowchart of one operation example of an information processing device of a client system according to the present embodiment.

FIG. 16 is a flowchart of one operation example of the information processing device 22 of the client system 2 according to the present embodiment. Steps S301 and S302 are added between steps S106 and S107 in FIG. 5 of the first embodiment. The remaining steps are identical to those in FIG. 5.

At step S301, the virtual space display control section 230 determines whether a viewer (i.e. the viewer avatar of the corresponding device) is present in the movement direction of the performer A01. If a viewer is present, the virtual space display control section 230 selects the viewer as a target to gain a gaze meeting experience (S302). If no viewer is present, the flow proceeds to step S114 where the virtual space display control section 230 performs another performance.

In the present embodiment, only a viewer who is present in the movement direction of the performer is selected. Alternatively, only a viewer positioned in the direction of the visual line of the performer may be selected.

According to the fourth embodiment, in a state where a plurality of viewers is present in the virtual space, only a viewer positioned in the movement direction of the performer is determined as a target to gain a gaze meeting experience. That is, among the plurality of viewers, a viewer who is not positioned in the movement direction of the performer does not gain a gaze meeting experience. Accordingly, the performer can give a more special feeling to the viewer who has gained the gaze meeting experience.

Fourth Embodiment

In the fourth embodiment, in a state where a plurality of performers is present in a virtual space, a performer to give a gaze meeting experience to a viewer is selected from among the plurality of performers. Hereinafter, the present embodiment will be explained in detail.

Figure 17:
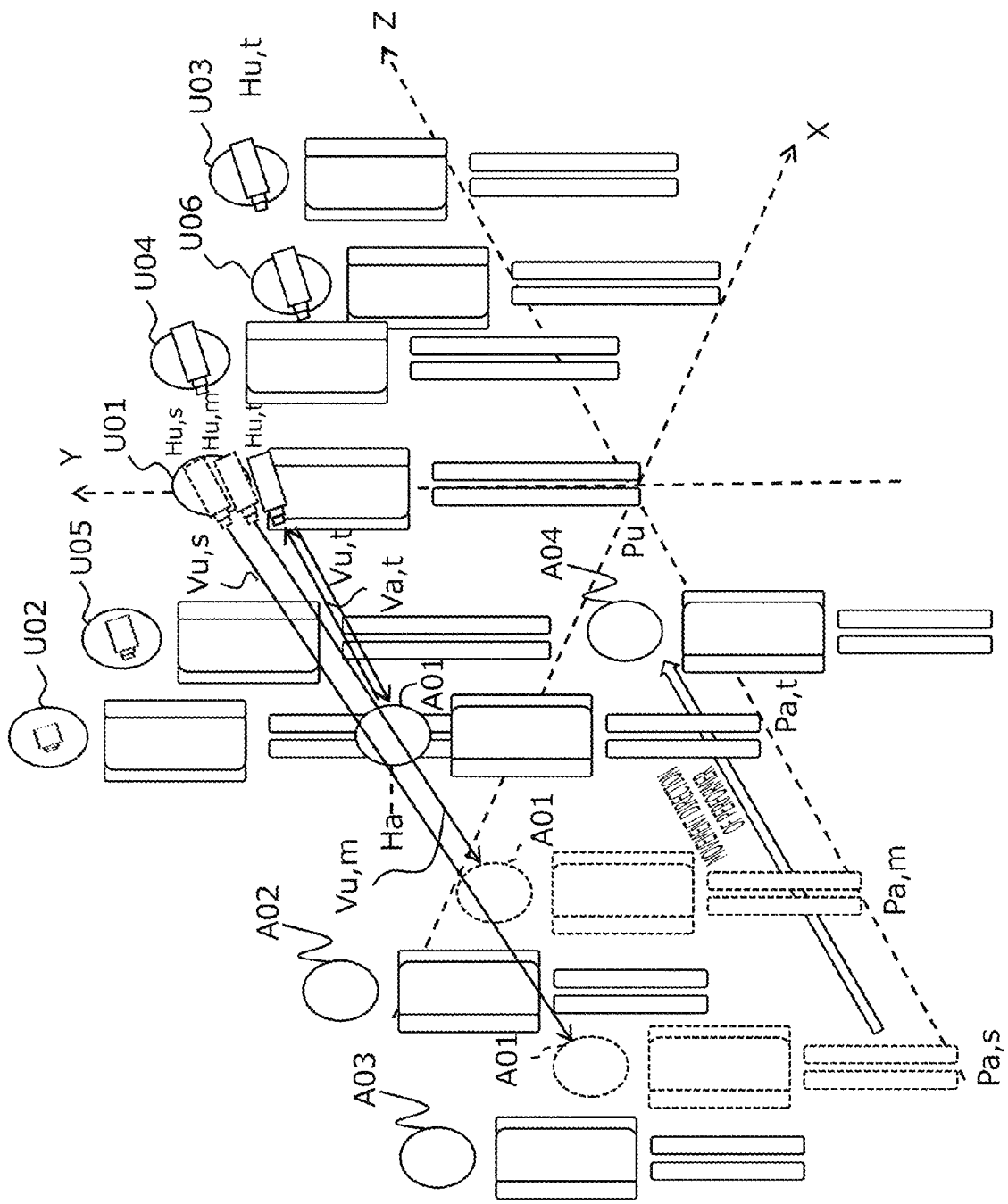
FIG. 17 is a diagram for explaining a process of adjusting the visual line of a performer and the visual line of a viewer to be opposed to each other in a virtual space.

FIG. 17 is a diagram for explaining a process of adjusting the visual line of a performer and the visual line of a viewer so as to be opposed to each other in a virtual space. A diagram for explaining a process of correcting the position of a virtual camera of the viewer in the virtual space is similar to FIG. 15.

In FIG. 17, performers A01, A02, A03, and A04 and a plurality of viewers U01, U02, U03, U04, U05, and U06 are present in the virtual space. The viewer of the corresponding device is the viewer U01.

For example, when a gaze-meeting scene starts, the virtual space display control section 230, a performer in the virtual space selects a performer as a target of a gaze meeting experience of the viewer U01. The virtual space display control section 230 selects a performer who is present in a direction that the viewer U01 faces (the direction of the face or the direction of the visual line vector). In the example in FIG. 17, when a gaze-meeting scene starts, the performer A01 in the position Pa,s is present in the direction of the visual line vector Vu,s of the viewer U01. Therefore, the performer A01 is selected. It is to be noted that Ha represents the height of the visual line of the performer A01. In addition, Hu,s represents the height of the visual line (virtual camera) of the viewer U01.

The virtual space display control section 230 determines whether the viewer U01 is present in the movement direction of the selected performer. If the viewer U01 is present, a process identical to that executed when it is determined that the viewer U01 is present in the movement direction of the performer in the third embodiment, is executed, whereby a gaze meeting experience is given to the user (viewer) of the viewer U01. If the viewer U01 is not present, a process identical to that of the first or second embodiment is executed, whereby a gaze meeting experience is given to the user (viewer) of the viewer U01.

Figure 18:
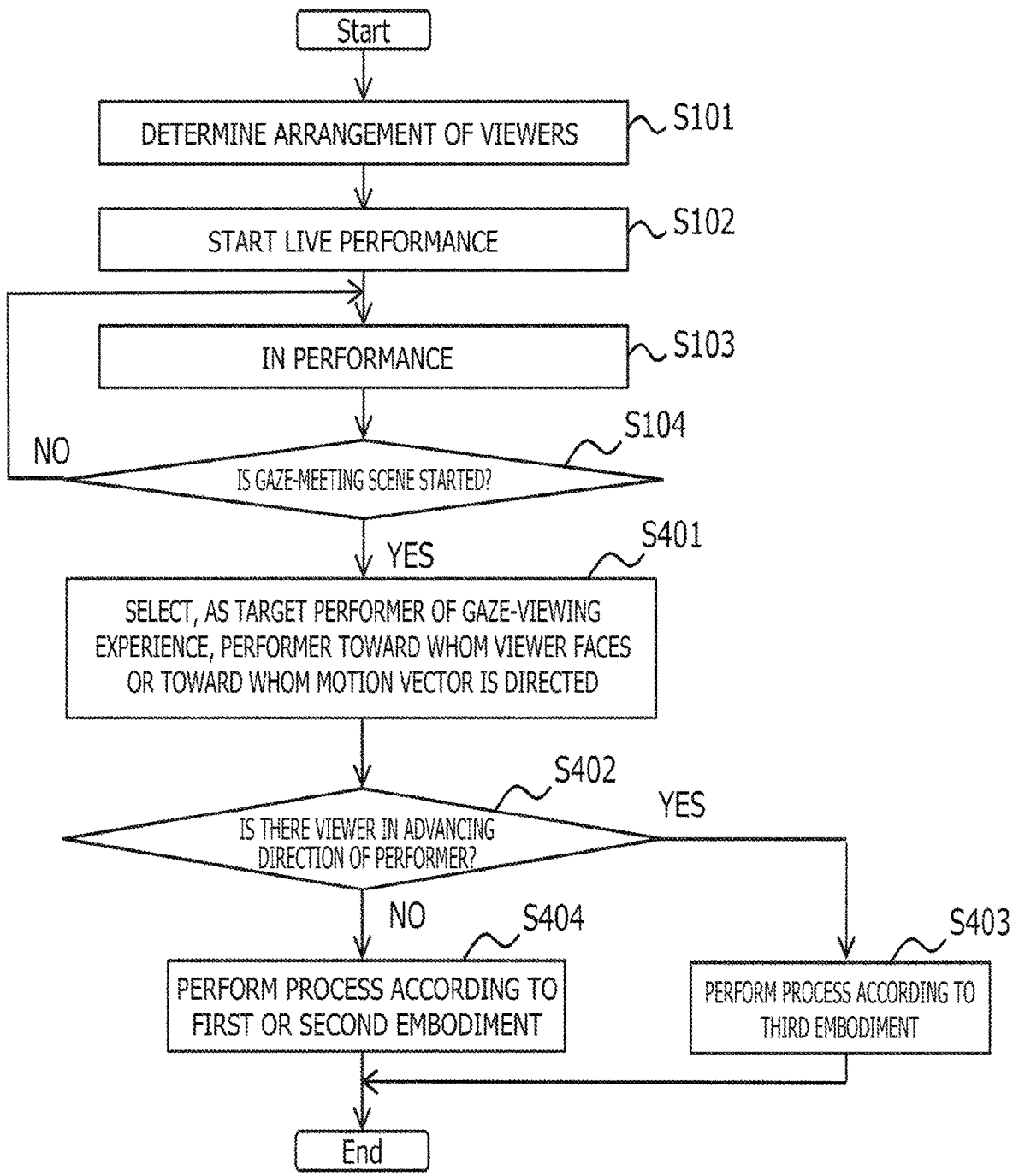
FIG. 18 is a flowchart of one operation example of an information processing device of a client system according to the present embodiment.

FIG. 18 is a flowchart of one operation example of the information processing device 22 of the client system 2 according to the present embodiment. In a case where a gaze-meeting scene is started (S104), the virtual space display control section 230 selects, as a target performer of a gaze meeting experience, a performer whom the face of the viewer U01 faces or the visual line vector of the viewer U01 is directed (S401). The virtual space display control section 230 determines whether the viewer U01 is present in the movement direction of the selected performer (S402). If the viewer U01 is present, the virtual space display control section 230 executes a process identical that of the third embodiment, whereby a gaze meeting experience is given to the viewer U01 (S403). If the viewer U01 is not present, the virtual space display control section 230 executes a process identical to that of the first or second embodiment, whereby a gaze meeting experience is given to the user (viewer) of the viewer U01.

According to the fourth embodiment, also in a case where a plurality of performers is present in the virtual space, a gaze meeting experience can be given to a viewer. Accordingly, the viewer can get a special feeling particularly for, among the plurality of performers, a performer who gives the gaze meeting experience.

First Modification of First to Fourth Embodiments

In a case where a head and hands, etc. are displayed as the viewer avatar in the virtual space, there is a possibility that the viewer gets a strange feeling on the avatar due to a corrected position of the virtual camera. For example, it is assumed that the pre-correction position of the virtual camera is at the height of the eyes of the head, and the post-correction position of the virtual camera is at the height of the shoulders. In this case, the viewer sees the hands of the avatar of the viewer from the shoulder height. Since the hands look closer than when the virtual camera is positioned on the head, the viewer gets a strange feeling. Therefore, a virtual camera correction range that does not give a strange feeling to the viewer may previously be determined. The virtual camera position correction section 227 corrects the position of the virtual camera within the correction range. As a result of this, the frequency with which the visual lines are opposed to each other (the satisfaction level of gaze experience meeting) is reduced, but a strange feeling is not given to the viewer. Accordingly, the viewer can be immersed in the virtual space.

Second Modification of First to Fourth Embodiments

In a case where the position or attitude of the virtual camera, the position (standing position) of the viewer, or the movement direction of the performer is seamlessly corrected or changed in the virtual space, it is not necessary to present a screen of a scene that is under the correction/change process, to the viewer. The virtual camera position control section 228 or the virtual space display control section 230 displays an image of another viewpoint instead, during the scene that is under the seamless correction/change process. If an image of the scene that is under the seamless correction/change process is generated, a processing load on the processor such as a CPU becomes high. However, if an image of another viewpoint is displayed instead, the processing load on the processor can be reduced. That is, the virtual camera position control section 228 or the virtual space display control section 230 temporarily moves (retreats) the virtual camera to another position (a first position) when the position of the virtual camera is being corrected, and moves the virtual camera to the corrected position of the virtual camera after the correction is completed.

Figure 19:
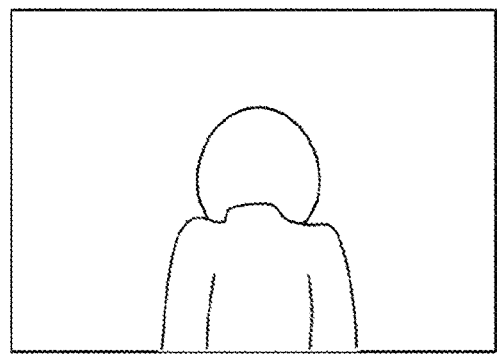
FIG. 19 is a diagram depicting a specific example of a second modification.
Figure 19:
Figure 19:
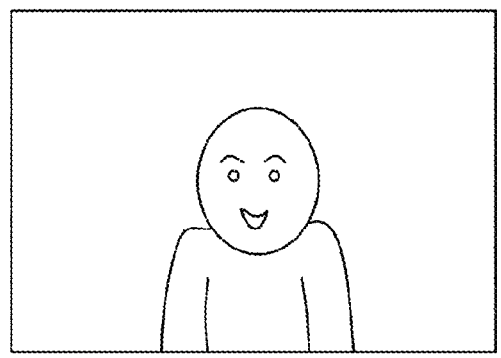

FIG. 19 is a diagram depicting a specific example of the second modification. The virtual camera position control section 228 or the virtual space display control section 230 presents an image of the viewpoint from the background of the performer, which is depicted on the upper side of FIG. 19, during a scene that is under the seamless correction/change process. The virtual camera position control section 228 or the virtual space display control section 230 restores the original viewpoint after the correction/change process is completed, and presents an image (an image of the original viewpoint after the seamless correction/change process is completed), which is depicted on the lower side of FIG. 19. Then, a gaze meeting experience is given to the viewer. In the example of the first embodiment, the image of another viewpoint is presented to the viewer during steps S105 to 110 of the flowchart in FIG. 5, and the original viewpoint is restored after step S111 is completed. Accordingly, the visual line of the viewer is opposed to the visual line of the performer when the image of the other viewpoint is switched to the image of the original viewpoint.

Third Modification of First to Fourth Embodiments

The explanations of the first to fourth embodiments have been given on the assumption that content in which a music live concert is carried out by a performer is distributed. The embodiments are also applicable to distribution of any other content, such as entertainment content of a live sport game or a variety show, or content of a remote class, a remote lesson, or remote work support. In a remote class or remote lesson, a teacher corresponds to a performer while a student corresponds to a viewer (user). In the case of remote work support, a work supporter corresponds to a performer while a support receiver corresponds to a viewer (user).

Fourth Modification of First to Fourth Embodiments

A portion of the blocks of the information processing device 22 may be included in the distribution server 13. For example, a partial function of the virtual space display control section 230, the virtual camera position correction section 227, or the like may be included in the distribution server 13. In a fourth modification, which is one example of a modification of the third embodiment, the distribution server 13 selects a viewer who is present in the movement direction of the performer, and determines the selected viewer as a gaze-meeting experience target. A report indicating that the viewer has been selected, is sent to the client system 2 of the selected viewer. The information processing device 22 of the client system 2 may acknowledge, at step 302 in FIG. 16, that the viewer thereof has been selected as a gaze-meeting experience target.

(Hardware Configuration)

Figure 20:
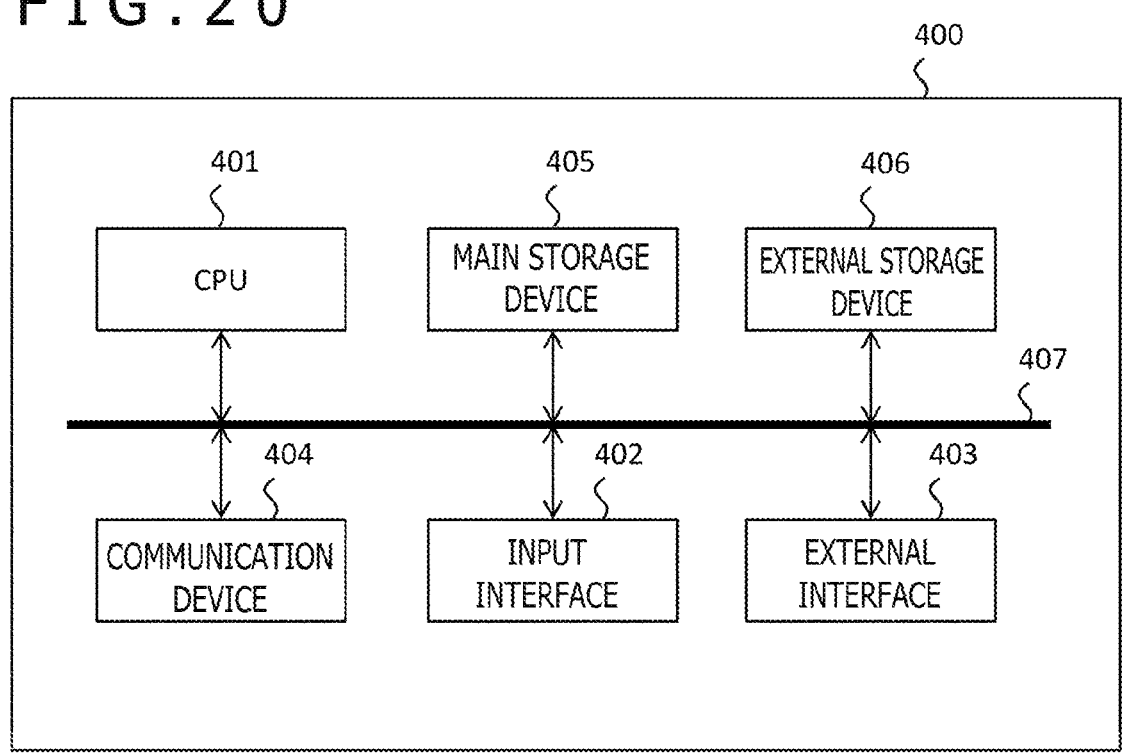
FIG. 20 is a diagram depicting one example of a hardware configuration of the information processing device.

FIG. 20 depicts one example of a hardware configuration of the information processing device 22. The information processing device 22 is formed of a computer device 400. The computer device 400 includes a CPU 401, an input interface 402, an external interface 403, a communication device 404, a main storage 405, and an external storage 406, which are mutually connected via a bus 407. By way of example, the computer device 400 is formed as a smartphone, a tablet, a desktop-type PC (personal computer), or a notebook-type PC.

The CPU (central processing unit) 401 executes, in the main storage 405, an information processing program which is a computer program. The information processing program refers to a program for implementing the aforementioned functional sections of the information processing device 22. The information processing program may be implemented not by one program but by a combination of multiple programs or scripts. The functional sections are implemented by the CPU 401 executing the information processing program.

The input interface 402 is a circuit for inputting operation signals supplied from input devices such as the hand controller 24, a keyboard, a mouse, and a touch panel, to the information processing device 22. The input interface 402 may include an image pickup device such as a camera, and a sensor such as a TOF (Time Of Flight) sensor or a LiDAR (Light Detection and Ranging) sensor.

The external interface 403 outputs data or information to an external device such as the HMD 23, an LCD (liquid crystal display), an organic electroluminescence display, a CRT (cathode ray tube), or a PDP (plasma display).

The communication device 404 is a circuit for allowing the information processing device 22 to wirelessly or wiredly communicate with an external device. Via the communication device 404, data can be inputted from the external device. Data inputted from the external device can be stored in the main storage 405 and the external storage 406.

The main storage 405 stores the information processing program, data necessary to execute the information processing program, and data generated by the execution of the information processing program. The information processing program is developed and executed in the main storage 405. The main storage 405 is a RAM, a DRAM, or an SRAM, for example, but is not limited thereto.

The external storage 406 stores the information processing program, data necessary to execute the information processing program, and data generated by the execution of the information processing program. The information program and the data are read out by the main storage 405 when the information processing programs are executed. The external storage 406 is a hard disk, an optical disc, a flash memory, or a magnetic tape, for example, but is not limited thereto.

It is to be noted that the information processing program may previously be installed in the computer device 400, or may be stored in a storage medium such as a CD-ROM. Alternatively, the information processing program may be previously uploaded to the internet.

Moreover, the information processing device 22 may be formed of a single computer device 400, or may be formed as a system including a plurality of mutually connected computer devices 400.

It is to be noted that the aforementioned embodiments each exemplify one example for embodying the present disclosure. The present disclosure can be implemented by other embodiments. For example, any modification, replacement, omission, or a combination thereof can be made within the gist of the present disclosure. An embodiment obtained by making such modification, replacement, omission, or the like, also falls within the scope of the present disclosure, and further, falls within the scope of the invention set forth in the claims and an equivalent thereof.

In addition, the effects of the present disclosure described in the present description are just examples, and thus, any other effect may be provided.

Note that the present disclosure can also take the following configurations.

(Item 1) An information processing device including:
a correction section that corrects a position of a virtual camera on the basis of first information regarding a height of a visual line of a performer in a virtual space and second information regarding a height of the virtual camera linked with a viewer in the virtual space.

(Item 2) The information processing device according to Item 1, in which
the correction section corrects the height of the virtual camera.

(Item 3) The information processing device according to Item 2, in which
the correction section corrects the height of the virtual camera in such a way that the virtual camera is directed to a face of the performer.

(Item 4) The information processing device according to any one of Items 1 to 3, in which
the first information includes information regarding at least one of a direction of the visual line of the performer and an angle of a head of the performer,
the second information includes information regarding an angle of the virtual camera, and
the correction section corrects the angle of the virtual camera on the basis of the first information and the second information.

(Item 5) The information processing device according to Item 4, in which
the correction section corrects the angle of the virtual camera in such a way that the virtual camera is directed to a face of the performer.

(Item 6) The information processing device according to any one of Items 1 to 5, in which
the correction section corrects the position of the virtual camera according to a movement direction of the performer.

(Item 7) The information processing device according to Item 6, further including:
a control section that moves a position of the viewer in the virtual space according to the movement direction of the performer.

(Item 8] The information processing device according to any one of Items 1 to 7, further including:
a control section that controls at least one of a movement direction of the performer and an angle of the performer according to a position of the viewer.

(Item 9) The information processing device according to any one of Items 1 to 8, in which
the correction section corrects the position of the virtual camera in a case where the viewer is present in a movement direction of the performer, and the correction section does not correct the position of the virtual camera in a case where the viewer is not present in the movement direction of the performer.

(Item 10) The information processing device according to any one of Items 1 to 9, in which
a plurality of the performers is present in the virtual space, and
the correction section selects, from among the plurality of the performers, a performer who is present in a direction to which the virtual camera is directed, and corrects the position of the virtual camera according to the first information on the selected performer.

(Item 11) The information processing device according to any one of Items 1 to 10, further including:
a control section that causes the performer to make a reaction to indicate that a visual line of the viewer is opposed to the visual line of the performer after the position of the virtual camera is corrected.

(Item 12) The information processing device according to any one of Items 1 to 12, further including:
a virtual camera position control section that temporarily moves the virtual camera to a first position when the position of the virtual camera is being corrected, and moves the position of the virtual camera to the corrected position of the virtual camera after the correction is completed.

(Item 13) The information processing device according to any one of Items 1 to 12, further including:
a detection section that detects the first information from content information including the performer.

(Item 14) The information processing device according to any one of Items 1 to 13, further including:
a virtual camera position control section that acquires, from a head device mounted on a user linked with the virtual camera, the second information regarding a position of the head device, and controls the position of the virtual camera on the basis of the second information.

(Item 15) The information processing device according to Item 14, further including:
a control section that generates an image on the basis of the position of the virtual camera, and displays the image on a monitor of the head device.

(Item 16) An information processing method including:
correcting a position of a virtual camera on the basis of first information regarding a height of a visual line of a performer in a virtual space and second information regarding a height of the virtual camera linked with a viewer in the virtual space.

(Item 17) An information distribution system including:
a distribution server that distributes content information including a performer;
a control section that places the performer in a virtual space on the basis of the content information, and places a virtual camera linked with a viewer in the virtual space; and
a correction section that corrects a position of the virtual camera on the basis of first information regarding a height of a visual line of the performer and second information regarding a height of the virtual camera.

REFERENCE SIGNS LIST

1: Server system
1-1 to 1-N: Image pickup camera
1A: Data acquisition section
1B: Subject
2: Client system
11: Multi-viewpoint camera
12: Sensor device
13: Distribution server
14: Communication section
21: Communication section
22: Information processing device
24: Hand controller
31: Virtual camera
32: Visual line
33: Visual line
34: Visual line
221: Other-viewer information reception section
222: Content information reception section
223: Viewer information transmission section
224: Other-viewer rendering section
225: Performer rendering section
226: Performer information detection section
227: Virtual camera position correction section
228: Virtual camera position control section
229: Viewer rendering section
230: Virtual space display control section
400: Computer device
CPU 401
402: Input interface
403: External interface
404: Communication device
405: Main storage
406: External storage
407: Bus

The invention claimed is:

1. An information processing device, comprising:
a correction section configured to correct a position of a virtual camera in a virtual space based on
a movement direction of a performer in the virtual space,
first information regarding a height of a visual line of the performer in the virtual space, and
second information regarding a height of the virtual camera, wherein the virtual camera is linked with a viewer in the virtual space, and
the height of the visual line of the performer and the height of the virtual camera are with respect to a plane in the virtual space.

2. The information processing device according to claim 1, wherein the correction section is further configured to correct the height of the virtual camera.

3. The information processing device according to claim 2, wherein the correction section is further configured to correct the height of the virtual camera in such a way that the virtual camera is directed to a face of the performer.

4. The information processing device according to claim 1, wherein
the first information includes information regarding at least one of a direction of the visual line of the performer or an angle of a head of the performer,
the second information includes information regarding an angle of the virtual camera, and
the correction section is further configured to correct the angle of the virtual camera based on a basis of the first information and the second information.

5. The information processing device according to claim 4, wherein the correction section is further configured to correct the angle of the virtual camera in such a way that the virtual camera is directed to a face of the performer.

6. The information processing device according to claim 1 further comprising a control section configured to move a position of the viewer in the virtual space based on the movement direction of the performer.

7. The information processing device according to claim 1, further comprising a control section configured to control, based on a position of the viewer in the virtual space, at least one of the movement direction of the performer or an angle of the performer.

8. The information processing device according to claim 1, wherein the correction section is further configured to:
correct the position of the virtual camera in a case where the viewer is present in the movement direction of the performer; and
does not correct the position of the virtual camera in a case where the viewer is not present in the movement direction of the performer.

9. The information processing device according to claim 1, wherein
a plurality of performers is present in the virtual space,
the plurality of performers includes the performer,
the performer is present in a direction to which the virtual camera is directed, and
the correction section is further configured to:
select, from among the plurality of performers, the performer who is present in the direction to which the virtual camera is directed; and correct the position of the virtual camera based on the first information on the selected performer.

10. The information processing device according to claim 1, further comprising a control section configured to cause, based on the correction of the position of the virtual camera, the performer to make a reaction to indicate that a visual line of the viewer is opposed to the visual line of the performer.

11. The information processing device according to claim 1, further comprising a virtual camera position control section configured to:
temporarily move the virtual camera to a specific position in the correction of the position of the virtual camera; and
move the position of the virtual camera to the corrected position of the virtual camera subsequent to completion of the correction.

12. The information processing device according to claim 1, further comprising a detection section configured to detect the first information from content information including the performer.

13. The information processing device according to claim 1, further comprising a virtual camera position control section configured to:
acquire, from a head device mounted on a user linked with the virtual camera, the second information regarding a position of the head device, wherein the user corresponds to the viewer; and
control the position of the virtual camera based on the second information.

14. The information processing device according to claim 13, further comprising a control section configured to:
generate an image based on the position of the virtual camera; and
display the image on a monitor of the head device.

15. An information processing method, comprising:
correcting a position of a virtual camera in a virtual space based on a movement direction of a performer in the virtual space,
first information regarding a height of a visual line of the performer in the virtual space, and
second information regarding a height of the virtual camera, wherein the virtual camera is linked with a viewer in the virtual space, and the height of the visual line of the performer and the height of the virtual camera are with respect to a plane in the virtual space.

16. An information distribution system, comprising:
a distribution server configured to distribute content information including a performer;
a control section configured to:
place the performer in a virtual space based on the content information; and
place a virtual camera linked with a viewer in the virtual space; and
a correction section configured to correct a position of the virtual camera in the virtual space based on
a movement direction of the performer in the virtual space,
first information regarding a height of a visual line of the performer, and
second information regarding a height of the virtual camera,
wherein the height of the visual line of the performer and the height of the virtual camera are with respect to a plane in the virtual space.

* * * * *